United States Patent
Kasamatsu

(10) Patent No.: US 10,613,342 B2
(45) Date of Patent: Apr. 7, 2020

(54) IMAGE STABILIZER AND ADJUSTMENT METHOD THEREOF, IMAGE STABILIZING CIRCUIT, IMAGE STABILIZING METHOD, AND CAMERA MODULE AND POSITION CONTROL METHOD OF OPTICAL COMPONENT THEREOF

(71) Applicant: ASAHI KASEI MICRODEVICES CORPORATION, Tokyo (JP)

(72) Inventor: Arata Kasamatsu, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 0 days.

(21) Appl. No.: 15/100,698

(22) PCT Filed: Dec. 5, 2014

(86) PCT No.: PCT/JP2014/006106
§ 371 (c)(1),
(2) Date: Jun. 1, 2016

(87) PCT Pub. No.: WO2015/087533
PCT Pub. Date: Jun. 18, 2015

(65) Prior Publication Data
US 2016/0327806 A1    Nov. 10, 2016

(30) Foreign Application Priority Data
Dec. 11, 2013  (JP) .................................. 2013-256276

(51) Int. Cl.
*G02B 27/64* (2006.01)
*G03B 5/00* (2006.01)
(Continued)

(52) U.S. Cl.
CPC ............. *G02B 27/646* (2013.01); *G02B 7/09* (2013.01); *G03B 5/00* (2013.01); *G03B 13/36* (2013.01);
(Continued)

(58) Field of Classification Search
CPC .......... G02B 27/646; G02B 7/09; G03B 5/00; G03B 13/36; H04N 5/23287
(Continued)

(56) References Cited

U.S. PATENT DOCUMENTS 6,128,035 A   10/2000 Kai et al.
6,396,961 B1 * 5/2002 Wixson ............. H04N 5/23248
                                               348/E5.046
(Continued)

FOREIGN PATENT DOCUMENTS

CN        1577033 A    2/2005
CN      101359147 A    2/2009
(Continued)

OTHER PUBLICATIONS

International Preliminary Report on Patentability dated Jun. 23, 2016, for the corresponding International Application No. PCT/JP2014/006106.
(Continued)

*Primary Examiner* — Noam Reisner
(74) *Attorney, Agent, or Firm* — Morgan, Lewis & Bockius LLP

(57) ABSTRACT

The present invention relates to an image stabilizer and a camera module. The image stabilizer for a lens that moves, with respect to an imaging element, in an auto-focus direction and a camera shake direction, includes a first position sensor, a distance signal calculation unit, a target position signal calculation circuit and a drive signal generation unit. A first detection position signal that indicates a position of
(Continued)

the lens that moves in the camera shake direction, a second detection position signal that indicates a position of the lens that moves in the auto-focus direction, and an angular velocity signal that indicate an angular velocity when the lens is inclined from the optical axis direction to output a drive signal. A drive unit moves the lens in the camera shake direction depending on the drive signal.

11 Claims, 11 Drawing Sheets

(51) Int. Cl.
  *G02B 7/09* (2006.01)
  *G03B 13/36* (2006.01)
(52) U.S. Cl.
  CPC ............... *G03B 2205/0007* (2013.01); *G03B 2217/005* (2013.01)
(58) Field of Classification Search
  USPC .......................................................... 396/55
  See application file for complete search history.

(56) References Cited

U.S. PATENT DOCUMENTS

| | | | |
|---|---|---|---|
| 7,840,128 B2 | 11/2010 | Takagi et al. | |
| 9,784,594 B2* | 10/2017 | David | G01D 5/145 |
| 2005/0018051 A1 | 1/2005 | Tomita et al. | |
| 2005/0128309 A1 | 6/2005 | Tomita et al. | |
| 2005/0195311 A1 | 9/2005 | Sasaki | |
| 2006/0056831 A1 | 3/2006 | Horio et al. | |
| 2009/0034950 A1 | 2/2009 | Takagi et al. | |
| 2009/0185042 A1* | 7/2009 | Miyahara | G03B 17/00 348/208.4 |
| 2010/0033583 A1 | 2/2010 | Tomita et al. | |
| 2010/0079604 A1 | 4/2010 | Washisu | |
| 2011/0013031 A1* | 1/2011 | Miyasako | G02B 27/646 348/208.99 |
| 2011/0013896 A1* | 1/2011 | Kawahara | G03B 5/00 396/55 |
| 2011/0157718 A1 | 6/2011 | Shinohara | |
| 2011/0169973 A1 | 7/2011 | Tomita et al. | |
| 2011/0267707 A1 | 11/2011 | Take | |
| 2012/0162769 A1 | 6/2012 | Suzuki et al. | |
| 2012/0224073 A1 | 9/2012 | Miyahara | |
| 2013/0163085 A1 | 6/2013 | Lim et al. | |
| 2015/0192799 A1 | 7/2015 | Moriya et al. | |
| 2016/0004091 A1 | 1/2016 | Lim et al. | |
| 2016/0241787 A1* | 8/2016 | Sekimoto | H04N 5/2257 |

FOREIGN PATENT DOCUMENTS

| | | |
|---|---|---|
| JP | H07-295008 A | 11/1995 |
| JP | H09-043659 A | 2/1997 |
| JP | 10-311997 | 11/1998 |
| JP | 2004-252037 A | 9/2004 |
| JP | 2005-252680 A | 9/2005 |
| JP | 2006-079007 A | 3/2006 |
| JP | 2007-058160 A | 3/2007 |
| JP | 2008-178206 A | 7/2008 |
| JP | 2009-169360 A | 7/2009 |
| JP | 2009-194856 A | 8/2009 |
| JP | 2010-085471 A | 4/2010 |
| JP | 2011-027999 A | 2/2011 |
| JP | 2011-064820 A | 3/2011 |
| JP | 2011-065140 A | 3/2011 |
| JP | 2011-133738 A | 7/2011 |
| JP | 2011-248339 A | 12/2011 |
| JP | 2013-238822 A | 11/2013 |
| KR | 2013-0072721 | 7/2013 |
| TW | 201344239 A | 11/2013 |
| WO | 2013/118503 A1 | 8/2013 |

OTHER PUBLICATIONS

International Search Report dated Mar. 17, 2015 for International Application No. PCT/JP2014/006106.

* cited by examiner

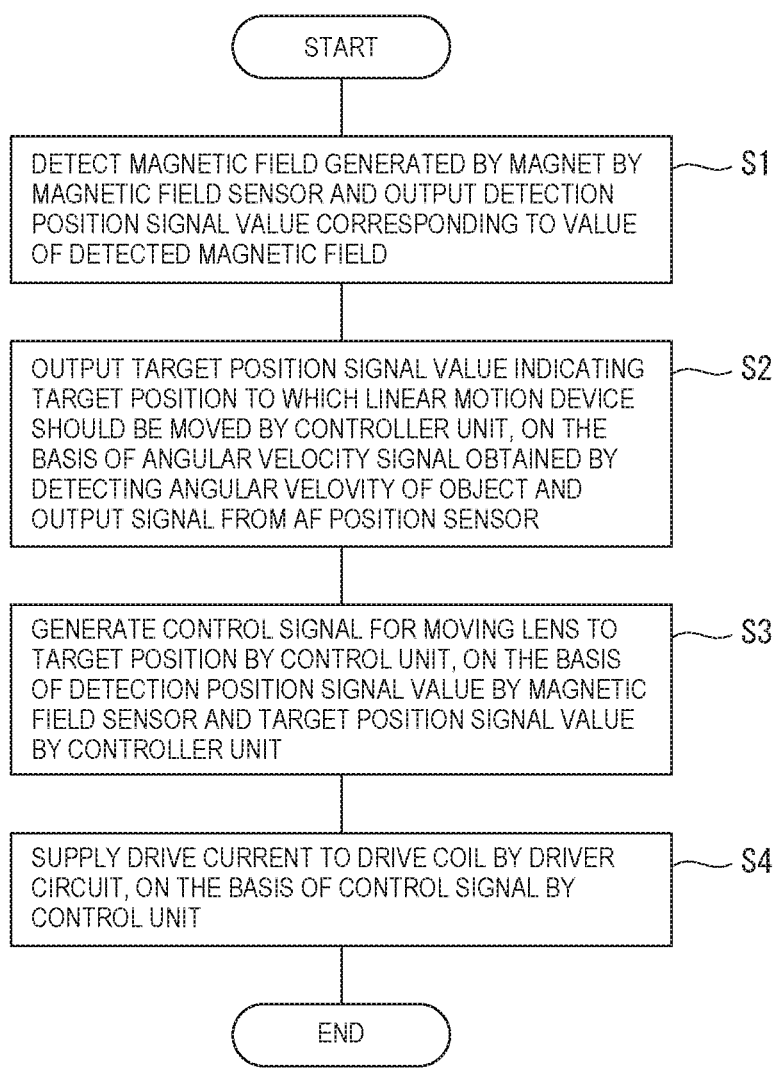

IMAGE STABILIZER AND ADJUSTMENT METHOD THEREOF, IMAGE STABILIZING CIRCUIT, IMAGE STABILIZING METHOD, AND CAMERA MODULE AND POSITION CONTROL METHOD OF OPTICAL COMPONENT THEREOF

TECHNICAL FIELD

The present invention relates to an image stabilizer and an adjustment method thereof, an image stabilizing circuit, an image stabilizing method, and a camera module and a position control method of an optical component thereof, and more particularly, relates to an image stabilizer and an adjustment method thereof, an image stabilizing circuit, an image stabilizing method, and a camera module and a position control method of an optical component thereof, in which information of a lens position in an AF mechanism in a lens module is fed back when controlling a lens position in an image stabilizing mechanism.

BACKGROUND ART

Generally, a gyroscope is a measuring instrument that detects an angle and an angular velocity of an object, and is also called a gyro or a gyro sensor. The gyroscope is used for autonomous navigation of a ship, an aircraft, or a rocket. Recently, the gyroscope is used also in a car navigation system, a self-driving system, a robot, a digital camera, a spydrone, or the like.

In addition, in recent years, there are more and more chances to photograph a still image using a small-sized camera for a mobile phone. Accordingly, various optical image stabilizers (OIS, hereinafter, referred to as image stabilizers) that can make a sharp image by preventing image blurring on an imaging plane even if there is camera shake (vibration) when photographing a still image has been conventionally proposed.

As this type of image stabilizing system, an optical system, such as a sensor shift system or a lens shift system, and a software system in which image stabilization is performed by image processing with software are known.

The sensor shift system has a configuration in which an imaging element (CCD or CMOS sensor) can move centering around a reference position by an actuator. In addition, the lens shift system has a structure in which a correction lens moves for adjustment in a plane perpendicular to an optical axis. Furthermore, in the software system, for example, a noise component is removed from a detection result of a detection means, and specific information necessary for correction of image blurring due to camera shake of an imaging device is calculated from a detection signal from which the noise component is removed, so that, in the state where the imaging device is still without camera shake, a captured image is also still. In addition, an image stabilizer in which camera shake is corrected by shaking a lens module (or camera module) itself that holds a lens and an imaging element has also been proposed.

For example, PTL 1 describes an image stabilizer capable of correcting camera shake generated when a still image is photographed by a small-sized camera for a mobile phone to photograph an image without image blurring. The image stabilizer is provided in an auto focus (AF) camera drive device, and a permanent magnet is used in common to reduce the number of components. As a result, the size (mainly, height) of the image stabilizer is made small (low).

In addition, in a camera device mounted on a mobile phone, in order to reduce the size and the cost, the drive system of a camera lens is not closed-loop control but is usually control in which a lens position is not fed back to a lens position control unit (hereinafter, referred to as open-loop control). According to this, for example, PTL 2 proposes an actuator drive device that drives an electromagnetic actuator by open-loop control and a camera device that drives a camera lens by a VCM (voice coil motor).

More specifically, the actuator drive device and the camera device described in PTL 2 do not perform control to feed back a position detection result of a movable portion to a lens position control unit to apply servo, and drive-control the actuator as if a predetermined amount of change was obtained when outputting a predetermined drive current. Accordingly, even when the camera lens is step-driven by open-loop control, by outputting a ramp-wave drive current corresponding to a natural vibration period T to the VCM, natural vibration is prevented from generating in the camera lens after the step drive, and the camera lens can be converged rapidly at a predetermined position. Accordingly, the time required for focus search can be significantly shortened.

In addition, PTL 3 relates to a television camera device having a system for presetting an imaging direction of a television camera by controlling an electric camera platform. The television camera device includes a control means that performs control of the electric camera platform by switching between an open-loop system and a feed-back system (closed-loop control), and the control means controls the television camera device to be at a preset position by performing control by the open-loop system and then performing control by the feed-back system, and performs position correction by the feed-back control after the television camera device is stopped at the preset position.

CITATION LIST

Patent Literature

PTL 1: JP 2011-65140 A
PTL 2: JP 2008-178206 A
PTL 3: JP 2009-194856 A

SUMMARY OF INVENTION

According to an aspect of the present invention, there is provided an image stabilizer for a lens that moves, with respect to an imaging element, in an auto-focus direction and a camera shake direction, the image stabilizer including: a first position sensor configured to detect a position of the lens that moves in the camera shake direction, and output a first detection position signal; a distance signal calculation unit configured to receive a second detection position signal that indicates a position of the lens that moves in the auto-focus direction, and calculate a distance signal between the imaging element and the lens; a target position signal calculation circuit configured to receive the distance signal, and an angular signal that indicates an angle at which the lens is inclined from the optical axis direction, and calculate a target position signal of the lens in the camera shake direction; and a drive signal generation unit configured to generate a drive signal that drives the lens in the camera shake direction, on the basis of the target position signal and the first detection position signal.

According to another aspect of the present invention, there is provided an adjustment method of an image stabilizer for a lens that moves, with respect to an imaging element, in an auto-focus direction and a camera shake direction, the adjustment method of an image stabilizer, including: moving the lens from one end to the other end of a moving range in the auto-focus direction; storing second detection position signals of a second position sensor detected at the both ends of the moving range in the auto-focus direction; moving the lens from one end to the other end of a moving range in the camera shake direction; and storing first detection position signals of a first position sensor detected at the both ends of the moving range in the camera shake direction.

According to another aspect of the present invention, there is provided an image stabilizing circuit for a lens that moves, with respect to an imaging element, in an auto-focus direction and a camera shake direction, the image stabilizing circuit including: a distance signal calculation unit configured to receive a second detection position signal that indicates a position of the lens that moves in the auto-focus direction, and calculate a distance signal between the imaging element and the lens; a target position signal calculation circuit configured to receive the distance signal, and an angular velocity signal that indicates an angular velocity when the lens is inclined from the optical axis direction, and calculate a target position signal of the lens in the camera shake direction; and a drive signal generation unit configured to generate a drive signal that drives the lens in the camera shake direction, on the basis of a first detection position signal that indicates a position of the lens that moves in the camera shake direction and the target position signal.

According to another aspect of the present invention, there is provided an image stabilizing method for performing image stabilization of a lens that moves, with respect to an imaging element, in an auto-focus direction and a camera shake direction, the image stabilizing method including: calculating a distance between the imaging element and the lens by detecting a position of the lens that moves in the auto-focus direction; calculating an angle inclined from an optical axis direction by detecting an angular velocity of the lens in the camera shake direction; calculating an amount of movement of the lens in the camera shake direction on the basis of the distance and the angle; detecting a current position of the lens that moves in the camera shake direction; and moving the lens in the camera shake direction from the current position, on the basis of the amount of movement.

According to another aspect of the present invention, there is provided a camera module including: a linear motion device having a lens capable of moving in a perpendicular direction and a parallel direction with respect to an optical axis; an actuator unit arranged in the vicinity of the linear motion device; a position detection sensor capable of detecting a position of the lens, a control unit capable of controlling the position of the lens; a controller unit configured to output a target position of the lens; and a driver unit configured to drive the actuator, wherein, the camera module is configured to move the lens by driving the actuator unit, and the camera module is configured to move the lens in a planar direction perpendicular to the optical axis direction to control a position of the lens in the planar direction by using also position information in the parallel direction with respect to the optical axis.

According to another aspect of the present invention, there is provided a camera module including: a linear motion device having a magnet attached to a movable body; an OIS drive coil arranged in the vicinity of the magnet of the linear motion device; and an AF drive coil, wherein, the camera module is configured to move a lens fixed to the magnet by force generated by flowing of a coil current in the OIS drive coil, and the camera module including: a magnetic field sensor configured to detect a magnetic field generated by the magnet and output a detection position signal value corresponding to a value of the detected magnetic field; an AF position sensor configured to detect a position of the lens driven by the AF drive coil; a controller unit configured to output a target position signal value indicating a target position to which the linear motion device should be moved, on the basis of an angular velocity signal obtained by detecting an angular velocity of an object and an output signal from the AF position sensor configured to detect a position in a parallel direction to an optical axis; a control unit configured to generate a control signal for moving the lens to the target position, on the basis of the detection position signal value by the magnetic field sensor and the target position signal value by the controller unit; and a driver circuit configured to supply a drive current to the OIS drive coil, on the basis of the control signal by the control unit.

According to another aspect of the present invention, there is provided a position control method of an optical component in a camera module including a linear motion device having a lens capable of moving in a perpendicular direction and a parallel direction with respect to an optical axis, an actuator unit arranged in the vicinity of the linear motion device, a position detection sensor capable of detecting a position of the lens, a control unit capable of controlling the position of the lens, a controller unit configured to output a target position of the lens, and a driver unit configured to drive the actuator, and the camera module being configured to move the lens by driving the actuator unit, the position control method including moving the lens in a planar direction perpendicular to the optical axis direction to control a position of the lens in the planar direction by using also position information in the parallel direction with respect to the optical axis.

According to another aspect of the present invention, there is provided a position control method of an optical component in a camera module, the camera module including a linear motion device having a magnet attached to a movable body, an OIS drive coil arranged in the vicinity of the magnet of the linear motion device, and an AF drive coil, and being configured to move a lens fixed to the magnet by force generated by flowing of a coil current in the OIS drive coil, the position control method including: detecting a magnetic field generated by the magnet and outputting a detection position signal value corresponding to a value of the detected magnetic field, by a magnetic field sensor; detecting a position of the lens driven by the AF drive coil, by an AF position sensor; outputting a target position signal value indicating a target position to which the linear motion device should be moved, on the basis of an angular velocity signal obtained by detecting an angular velocity of an object and an output signal from the AF position sensor configured to detect a position in a parallel direction to an optical axis, by a controller unit; generating a control signal for moving the lens to the target position, on the basis of the detection position signal value by the magnetic field sensor and the target position signal value by the controller unit, by a control unit; and supplying a drive current to the OIS drive coil, on the basis of the control signal by the control unit, by a driver circuit.

BRIEF DESCRIPTION OF DRAWINGS

FIG. 12 is a diagram illustrating a flow chart for describing a position control method of an optical component (lens) in the camera module according to the present invention.

DESCRIPTION OF EMBODIMENTS

Figure 1:
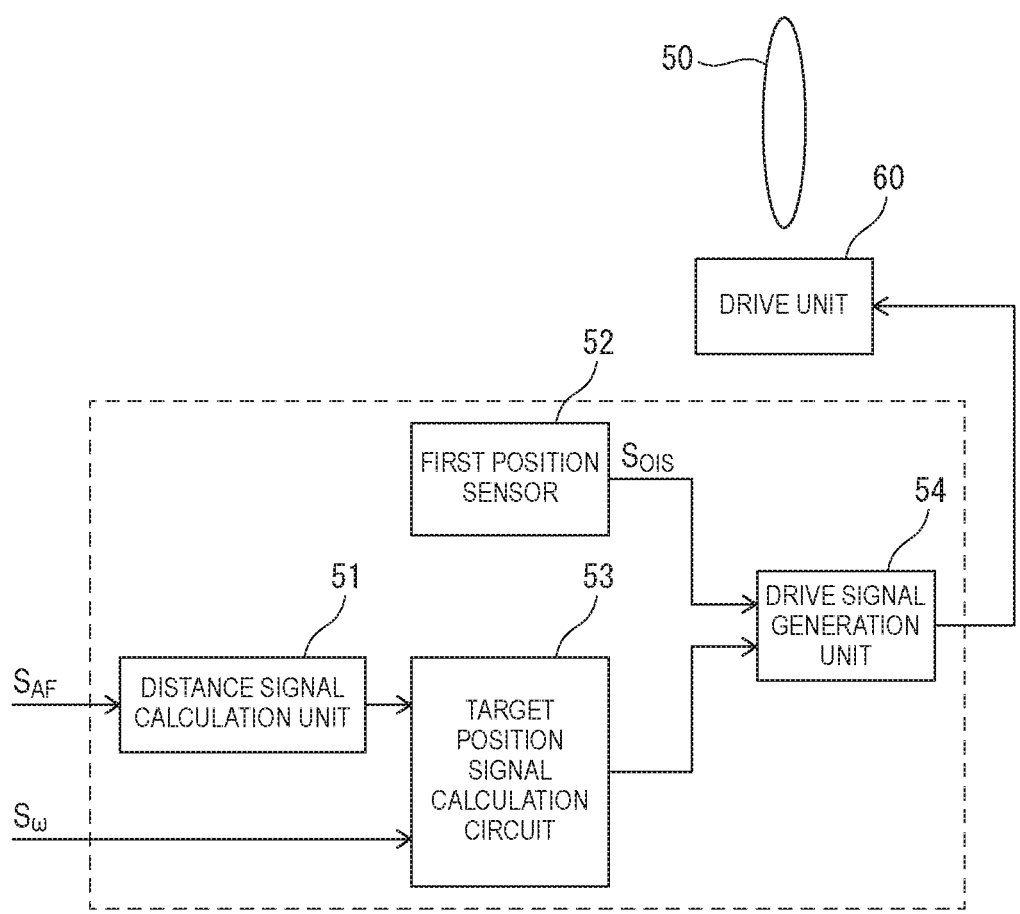
FIG. 1 is a configuration diagram for describing an image stabilizer according to a first embodiment of the present invention.

Since the image stabilizer of PTL 1 does not detect a lens position in an AF direction, a precise distance between a CMOS and a lens is not understood, and thus, there is a disadvantage in that the performance of an image stabilizing function is poor.

In addition, an auto-focus mechanism in PTL 2 described above is the open-loop control, and thus, there was the same problem as PTL 1 described above. Furthermore, the television camera device described in PTL 3 described above performs the control of the electric camera platform in the television camera device by switching between the open-loop system and the feed-back system, and does not improve the performance of an image stabilizing mechanism by feeding back information of a lens position to the image stabilizing mechanism as in the present invention.

In a compact digital still camera, an AF lens and an image stabilizing lens exist separately. Therefore, a distance F between the image stabilizing lens and an imaging element is constant, and thus, a coefficient Co in a relationship of f*Co for obtaining the distance F (f is a design distance between the lens and the imaging element, and Co is a coefficient) was unnecessary. However, in a smartphone, an AF lens and an image stabilizing lens are used in common because of the limitation of the size. Therefore, a distance between the image stabilizing lens and an imaging element may be changed by an AF operation.

In such a circumstance, in a conventional smartphone, the distance F is not correctly measured, and even if correction is performed, the correction is not optimum correction. Thus, the present invention aims to improve the image stabilizing performance by correctly grasping a distance between a lens and an imaging element.

The present invention has been made in view of such a circumstance, and an object of the present invention is to provide an image stabilizer and an adjustment method thereof, an image stabilizing circuit, an image stabilizing method, and a camera module and a position control method of an optical component thereof, in which the performance of an image stabilizing mechanism is improved by feeding back information of a lens position in a lens module to the image stabilizing mechanism.

An aspect of the present invention includes following features.

(1) An image stabilizer for a lens that moves, with respect to an imaging element, in an auto-focus direction and a camera shake direction, the image stabilizer including: a first position sensor configured to detect a position of the lens that moves in the camera shake direction, and output a first detection position signal; a distance signal calculation unit configured to receive a second detection position signal that indicates a position of the lens that moves in the auto-focus direction, and calculate a distance signal between the imaging element and the lens; a target position signal calculation circuit configured to receive the distance signal, and an angular signal that indicates an angle at which the lens is inclined from the optical axis direction, and calculate a target position signal of the lens in the camera shake direction; and a drive signal generation unit configured to generate a drive signal that drives the lens in the camera shake direction, on the basis of the target position signal and the first detection position signal.

(2) In the feature (1), the target position signal calculation circuit is configured to calculate the target position signal, on the basis of a distance F between the imaging element and the lens calculated on the basis of the second detection position signal and the angle $\theta$ at which the lens is inclined from the optical axis direction, such that an amount X of movement in the camera shake direction is a following relational expression:

$$X = F \times \tan \theta.$$

(3) In the feature (1) or (2), the distance signal calculation unit further includes a storage unit in which a correspondence relationship between the second detection position signal and a distance between the imaging element and the lens is stored, and is configured to output the distance signal corresponding to the distance between the imaging element and the lens from the storage unit, on the basis of the inputted second detection position signal.

(4) A position control device including: the image stabilizer according to any one of (1) to (3); a drive unit configured to drive the lens in the camera shake direction in accordance with the drive signal; a second position sensor configured to detect the position of the lens that moves in the auto-focus direction, and output the second detection position signal; an angular velocity sensor configured to detect an angular velocity when the lens is inclined from the optical axis direction, and output an angular velocity signal; and an integration circuit configured to integrate the angular velocity signal to calculate the angular signal.

(5) An adjustment method of an image stabilizer for a lens that moves, with respect to an imaging element, in an auto-focus direction and a camera shake direction, the adjustment method of an image stabilizer, including: moving the lens from one end to the other end of a moving range in the auto-focus direction; storing second detection position signals of a second position sensor detected at the both ends of the moving range in the auto-focus direction; moving the lens from one end to the other end of a moving range in the camera shake direction; and storing first detection position signals of a first position sensor detected at the both ends of the moving range in the camera shake direction.

(6) An image stabilizing circuit for a lens that moves, with respect to an imaging element, in an auto-focus direction and a camera shake direction, the image stabilizing circuit including: a distance signal calculation unit configured to receive a second detection position signal that indicates a position of the lens that moves in the auto-focus direction, and calculate a distance signal between the imaging element and the lens; a target position signal calculation circuit configured to receive the distance signal, and an angular velocity signal that indicates an angular velocity when the lens is inclined from the optical axis direction, and calculate a target position signal of the lens in the camera shake direction; and a drive signal generation unit configured to generate a drive signal that drives the lens in the camera shake direction, on the basis of a first detection position signal that indicates a position of the lens that moves in the camera shake direction and the target position signal.

(7) In the feature (6), the distance signal calculation unit further includes a second storage unit in which a correspondence relationship between the second detection position signal and a distance between the imaging element and the lens, and is configured to output the distance signal corresponding to the distance between the imaging element and the lens from the second storage unit, on the basis of the inputted second detection position signal.

(8) In the feature (6) or (7), the target position signal calculation circuit includes an integration circuit configured to integrate the angular velocity signal to output an angular signal, and an operation circuit configured to calculate the target position signal corresponding to an amount of movement in the camera shake direction on the basis of the angular signal and the distance signal.

(9) In the feature (8), the target position signal calculation circuit includes a first storage unit in which a correspondence relationship between the amount of movement and the first detection position signal.

(10) An image stabilizing method for performing image stabilization of a lens that moves, with respect to an imaging element, in an auto-focus direction and a camera shake direction, the image stabilizing method including: calculating a distance between the imaging element and the lens by detecting a position of the lens that moves in the auto-focus direction; calculating an angle inclined from an optical axis direction by detecting an angular velocity of the lens in the camera shake direction; calculating an amount of movement of the lens in the camera shake direction on the basis of the distance and the angle; detecting a current position of the lens that moves in the camera shake direction; and moving the lens in the camera shake direction from the current position, on the basis of the amount of movement.

(11) A camera module including: a linear motion device having a lens capable of moving in a perpendicular direction and a parallel direction with respect to an optical axis; an actuator unit arranged in the vicinity of the linear motion device; a position detection sensor capable of detecting a position of the lens, a control unit capable of controlling the position of the lens; a controller circuit configured to output a target position of the lens; and a driver unit configured to drive the actuator, wherein, the camera module is configured to move the lens by driving the actuator unit, and the camera module is configured to move the lens in a planar direction perpendicular to the optical axis direction to control a position of the lens in the planar direction by using position information in the parallel direction with respect to the optical axis.

(12) A camera module including: a linear motion device having a magnet attached to a movable body; an OIS drive coil arranged in the vicinity of the magnet of the linear motion device; and an AF drive coil, wherein, the camera module is configured to move a lens fixed to the magnet by force generated by flowing of a coil current in the OIS drive coil, and the camera module including: a magnetic field sensor configured to detect a magnetic field generated by the magnet and output a detection position signal value corresponding to a value of the detected magnetic field; an AF position sensor configured to detect a position of the lens driven by the AF drive coil; a controller circuit configured to output a target position signal value indicating a target position to which the linear motion device should be moved, on the basis of an angular velocity signal obtained by detecting an angular velocity of an object and an output signal from the AF position sensor configured to detect a position in a parallel direction to an optical axis; a control unit configured to generate a control signal for moving the lens to the target position, on the basis of the detection position signal value by the magnetic field sensor and the target position signal value by the controller circuit; and a driver circuit configured to supply a drive current to the OIS drive coil, on the basis of the control signal by the control unit.

(13) In the feature (12), the controller circuit is configured to operate, on the basis of an angular signal obtained by integrating the angular velocity signal and a distance signal between the lens and an imaging element, a distance signal by which the lens should be moved using a following relational expression:

$$X = \tan\theta \times F$$

to obtain the target position signal value.

(14) In the feature (13), the controller circuit includes: an integration circuit configured to obtain the angular signal on the basis of the angular velocity signal; a first operation circuit configured to obtain the distance signal between the lens and the imaging element, on the basis of the output signal from the AF position sensor configured to detect the position in the parallel direction to the optical axis; and a second operation circuit configured to obtain the target position signal value, on the basis of the angular signal from the integration circuit and the distance signal from the first operation circuit.

(15) In the feature (14), the controller circuit includes: a memory in which calibration information based on a relationship between the position of the lens and an output from the magnetic field sensor, calibration information based on a relationship between the position of the lens and an output from a sensor configured to detect the position in the parallel direction to the optical axis, and information based on a relationship between a subject distance and a distance between the lens and the imaging element are stored.

(16) In anyone of the features (11) to (15), the control unit generates the control signal by PID control.

(17) In any one of the features (11) to (16), the magnetic field sensor is a Hall element.

(18) In any one of the features (11) to (17), the linear motion device and the drive coil are embedded in the camera module.

(19) A position control method of an optical component in a camera module including a linear motion device having a lens capable of moving in a perpendicular direction and a parallel direction with respect to an optical axis, an actuator unit arranged in the vicinity of the linear motion device, a position detection sensor capable of detecting a position of the lens, a control unit capable of controlling the position of the lens, a controller circuit configured to output a target position of the lens, and a driver unit configured to drive the actuator, and the camera module being configured to move the lens by driving the actuator unit, the position control method including moving the lens in a planar direction perpendicular to the optical axis direction to control a position of the lens in the planar direction by using position information in the parallel direction with respect to the optical axis.

(20) A position control method of an optical component in a camera module, the camera module including a linear motion device having a magnet attached to a movable body, an OIS drive coil arranged in the vicinity of the magnet of the linear motion device, and an AF drive coil, and being configured to move a lens fixed to the magnet by force generated by flowing of a coil current in the OIS drive coil, the position control method including: detecting a magnetic field generated by the magnet and outputting a detection position signal value corresponding to a value of the detected magnetic field, by a magnetic field sensor; detecting a position of the lens driven by the AF drive coil, by an AF position sensor; outputting a target position signal value indicating a target position to which the linear motion device should be moved, on the basis of an angular velocity signal obtained by detecting an angular velocity of an object and an output signal from the AF position sensor configured to detect a position in a parallel direction to an optical axis, by a controller circuit; generating a control signal for moving the lens to the target position, on the basis of the detection position signal value by the magnetic field sensor and the target position signal value by the controller circuit, by a control unit; and supplying a drive current to the OIS drive coil, on the basis of the control signal by the control unit, by a driver circuit.

(21) In the outputting the target position signal value by the controller circuit in the feature (20), on the basis of an angular signal obtained by integrating the angular velocity signal and a distance signal between the lens and an imaging element, a distance signal by which the lens should be moved is operated using a following relational expression:

$$X = \tan\theta \times F$$

to obtain the target position signal value.

(22) In the feature (21), the outputting the target position signal value by the controller circuit, includes: obtaining the angular signal on the basis of the angular velocity signal, by an integration circuit; obtaining the distance signal between the lens and the imaging element, on the basis of the output signal from the AF position sensor configured to detect the position in the parallel direction to the optical axis, by a first operation circuit; and obtaining the target position signal value, on the basis of the angular signal from the integration circuit and the distance signal from the first operation circuit, by a second operation circuit.

(23) In the feature (22), the outputting the target position signal value by the controller circuit includes: storing calibration information based on a relationship between the position of the lens and the output from the magnetic field sensor, calibration information based on a relationship between the position of the lens and an output from a sensor configured to detect the position in the parallel direction to the optical axis, and information based on a relationship between a subject distance and a distance between the lens and the imaging element, in a memory.

(24) In any one of the features (20) to (23), in the generating the control signal by the control unit, the control signal is generated by PID control.

In the following detailed description, a number of specific details will be described for providing complete understanding of embodiments of the present invention. However, it is clear that one or more embodiments are practicable without such specific details. In addition, well-known structures and devices are illustrated by diagrams for simplifying the drawings.

Hereinafter, the respective embodiments of the present invention will be described with reference to the drawings.

First Embodiment

FIG. 1 is a configuration diagram for describing an image stabilizer according to a first embodiment of the present invention.

The image stabilizer of the first embodiment is an image stabilizer for a lens 50 that moves, with respect to an imaging element, in an auto-focus direction and a camera shake direction, and includes a first position sensor 52, a distance signal calculation unit 51, a target position signal calculation circuit 53, and a drive signal generation unit 54.

In the first embodiment, an image stabilizing circuit includes the distance signal calculation unit 51, the target position signal calculation circuit 53, and the drive signal generation unit 54. The image stabilizing circuit receives a first detection position signal that indicates the position of the lens 50 that moves in the camera shake direction, a second detection position signal that indicates the position of the lens 50 that moves in the auto-focus direction, and an angular velocity signal that indicates the angular velocity when the lens is inclined from an optical axis direction, and outputs a drive signal. A drive unit 60 moves the lens in the camera shake direction in accordance with the drive signal.

The first position sensor 52 detects the position of the lens that moves in the camera shake direction, and outputs the first detection position signal. Examples thereof include a magnetic sensor that detects the magnetic field of a magnet attached to the lens. The camera shake direction is a direction perpendicular to the optical axis. For example, the first position sensor 52 is configured such that an output signal thereof varies linearly in accordance with the movement of the lens in the camera shake direction. The first position sensor 52 detects the current position of the lens in the camera shake direction.

The distance signal calculation unit 51 receives the second detection position signal that indicates the position of the lens that moves in the auto-focus direction, and calculates a distance signal between the imaging element and the lens. The position of the lens that moves in the auto-focus direction is detected by a second position sensor, and the distance signal corresponding to a distance F between the imaging element and the lens is calculated on the basis of the detected second detection position signal. Examples of the second position sensor include a magnetic sensor that detects the magnetic field of a magnet attached to the lens. For example, the second position sensor is configured such that an output signal thereof varies linearly in accordance with the movement of the lens in the auto-focus direction. The second position sensor detects the current position of the lens in the auto-focus direction.

The target position signal calculation circuit 53 receives the distance signal, and the angular velocity signal that indicates the angular velocity when the lens is inclined from the optical axis direction or an angular signal that indicates the angle at which the lens is inclined from the optical axis direction, and calculates a target position signal of the lens in the camera shake direction. In particular, as a target position, an operation of F×tan θ is performed on the basis of the distance F between the lens and the imaging element and the angle θ at which the lens is inclined from the optical axis direction to obtain a target position. The target position signal calculation circuit 53 outputs the target position signal for moving the lens to the target position. When the sign of the output signal of the first position sensor 52 is changed in accordance with the inclined direction of the lens from the optical axis direction, the target position signal may also be configured such that the sign thereof is changed in accordance with the inclined direction.

The drive signal generation unit 54 generates a drive signal that drives the lens in the camera shake direction, on the basis of the target position signal and the first detection position signal. The drive signal is generated on the basis of a difference between the target position signal corresponding to the target position of the lens in the camera shake direction and the first detection position signal corresponding to the current position of the lens. The drive unit drives the lens in the camera shake direction, on the basis of the drive signal. The drive unit is configured by, for example, a coil, and drives the lens with a magnet in the camera shake direction by a magnetic field generated by flowing of a coil current.

According to the first embodiment, image stabilization can be accurately performed also when the lens moves in the auto-focus direction.

Figure 2A:
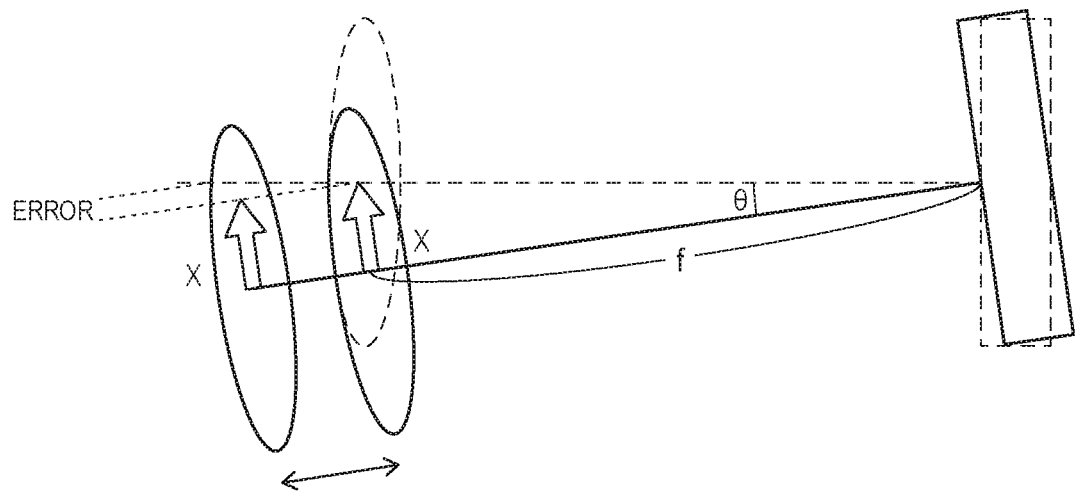
FIG. 2A and FIG. 2B are schematic diagrams for describing image stabilization of the first embodiment.
Figure 2B:
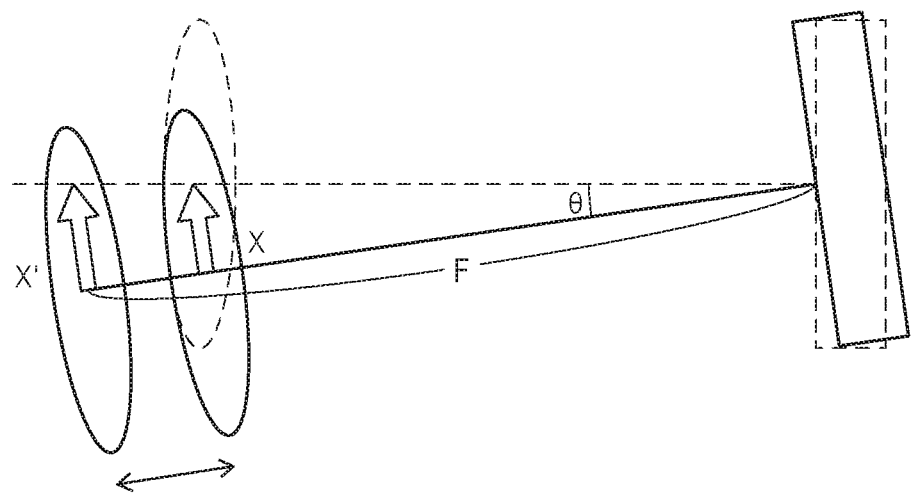

FIG. 2A and FIG. 2B are schematic diagrams for describing the image stabilization of the first embodiment.

FIG. 2A is a schematic diagram for describing conventional image stabilization. When the imaging element and the lens are inclined from the optical axis by the angle θ due to camera shake, image stabilization is performed by moving the lens in the camera shake direction by a distance f×tan θ, where f is a fixed distance between the lens and the imaging element. However, when the lens moves in the auto-focus direction, the amount of movement is insufficient, and thus, the image stabilization cannot be accurately performed.

On the other hand, FIG. 2B is a schematic diagram for describing the image stabilization of the first embodiment. When the imaging element and the lens are inclined from the optical axis by the angle θ due to camera shake, the distance F between the imaging element and the lens can be calculated using the position signal AF in the auto-focus direction, and thus, the image stabilization can be accurately performed by moving the lens in the camera shake direction by a distance F×tan θ. More specifically, in the first embodiment, a current distance signal between the imaging element and the lens can be obtained by detection of the position of the lens in the auto-focus direction, and the image stabilization is performed on the basis of the current distance signal, and thus, the accurate image stabilization can be performed.

In particular, for use in smartphones and the like, auto focus and image stabilization are performed by the same lens, and miniaturization advances, and thus, there is a great advantage on the point that the error can be reduced.

Figure 3:
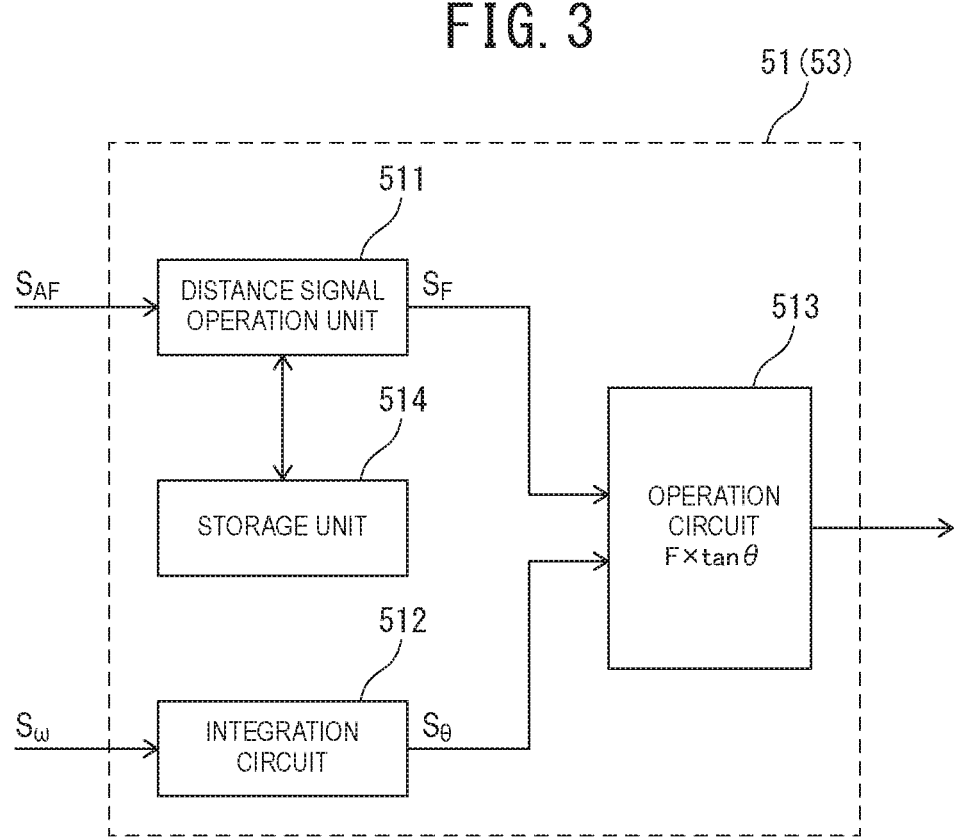
FIG. 3 is a diagram illustrating an example of a distance signal calculation unit and a target position signal calculation circuit.
Figure 4:
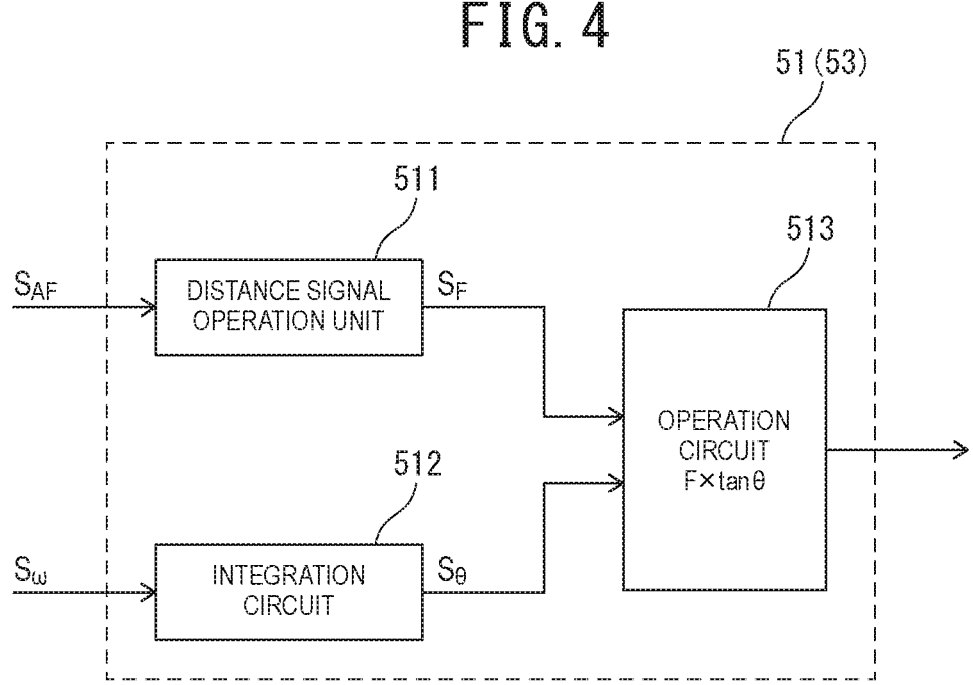
FIG. 4 is a diagram illustrating an example of the distance signal calculation unit and the target position signal calculation circuit.

FIG. 3 and FIG. 4 are diagrams illustrating examples of a distance signal calculation unit and a target position signal calculation circuit. It is to be noted that, in the drawings, reference numerals 511, 512, 513, and 514 represent a distance signal operation unit, an integration circuit, an operation circuit, and a storage unit, respectively.

In FIG. 3, the second detection position signal $S_{AF}$ and the angular velocity signal $S_\omega$ are inputted, and the target position signal is outputted. A correspondence relationship between the second detection position signal $S_{AF}$ and the distance F between the lens and the imaging element is stored in the storage unit 514, and the distance signal F is read from the storage unit 514 on the basis of the second detection position signal $S_{AF}$ and is outputted to a subsequent stage. In addition, the angle θ at which the lens is inclined from the optical axis is calculated by integrating the angular velocity signal $S_\omega$ and is outputted to a subsequent stage. The operation circuit 513 operates the distance F×tan θ, where F is distance between the imaging element and the lens, and calculates the amount X of movement of the lens in the camera shake direction. The target position signal corresponds to the amount X of movement.

In FIG. 4, the second detection position signal $S_{AF}$ and the angular velocity signal $S_\omega$ are inputted, and the target position signal is outputted. The distance signal F obtained by adding a distance Y of the lens moved from a reference position in the auto-focus direction, which is obtained from the second detection position signal $S_{AF}$, to a reference distance f between the lens and the imaging element is outputted to a subsequent stage. In addition, the angle θ at which the lens is inclined from the optical axis is calculated by integrating the angular velocity signal $S_\omega$ and is outputted to a subsequent stage. The operation circuit 513 operates F×tan θ (=(f+Y)×tan θ), where F is the distance between the imaging element and the lens, and calculates the amount X of movement of the lens in the camera shake direction. The target position signal corresponds to the amount X of movement. It is to be noted that a mode in which a coefficient Co to be operated with respect to the reference distance f between the imaging element and the lens is calculated from the second detection position signal $S_{AF}$, and the coefficient Co is operated with respect to the reference distance f to output the distance signal F (=f×Co) may be used.

In addition, a mode capable of correcting an error of the amount of movement of the lens in the camera shake direction using information regarding the current position of the lens in the auto-focus direction may be used.

Second Embodiment

Figure 5:
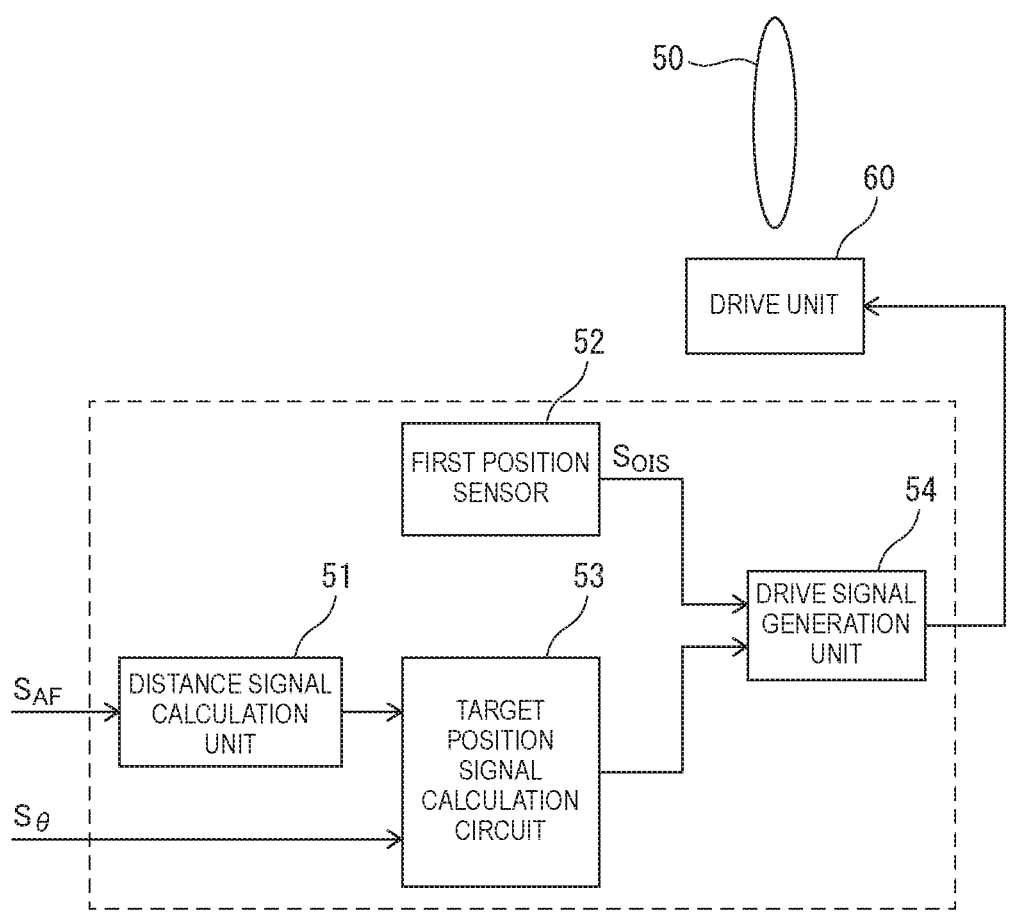
FIG. 5 is a configuration diagram for describing an image stabilizer according to a second embodiment of the present invention.

FIG. 5 is a configuration diagram for describing an image stabilizer according to a second embodiment of the present invention.

The target position signal calculation circuit 53 in the second embodiment receives the distance signal and the angular signal that indicates the angle at which the lens is inclined from the optical axis direction, and calculates a target position signal of the lens in the camera shake direction. In particular, as a target position, an operation of F×tan θ is performed on the basis of the distance F between the lens and the imaging element and the angle θ at which the lens is inclined from the optical axis direction to obtain a target position.

The second embodiment is a mode without an integration circuit that integrates an angular velocity signal to output an angular signal in the target position signal calculation circuit 53.

Third Embodiment

Figure 6:
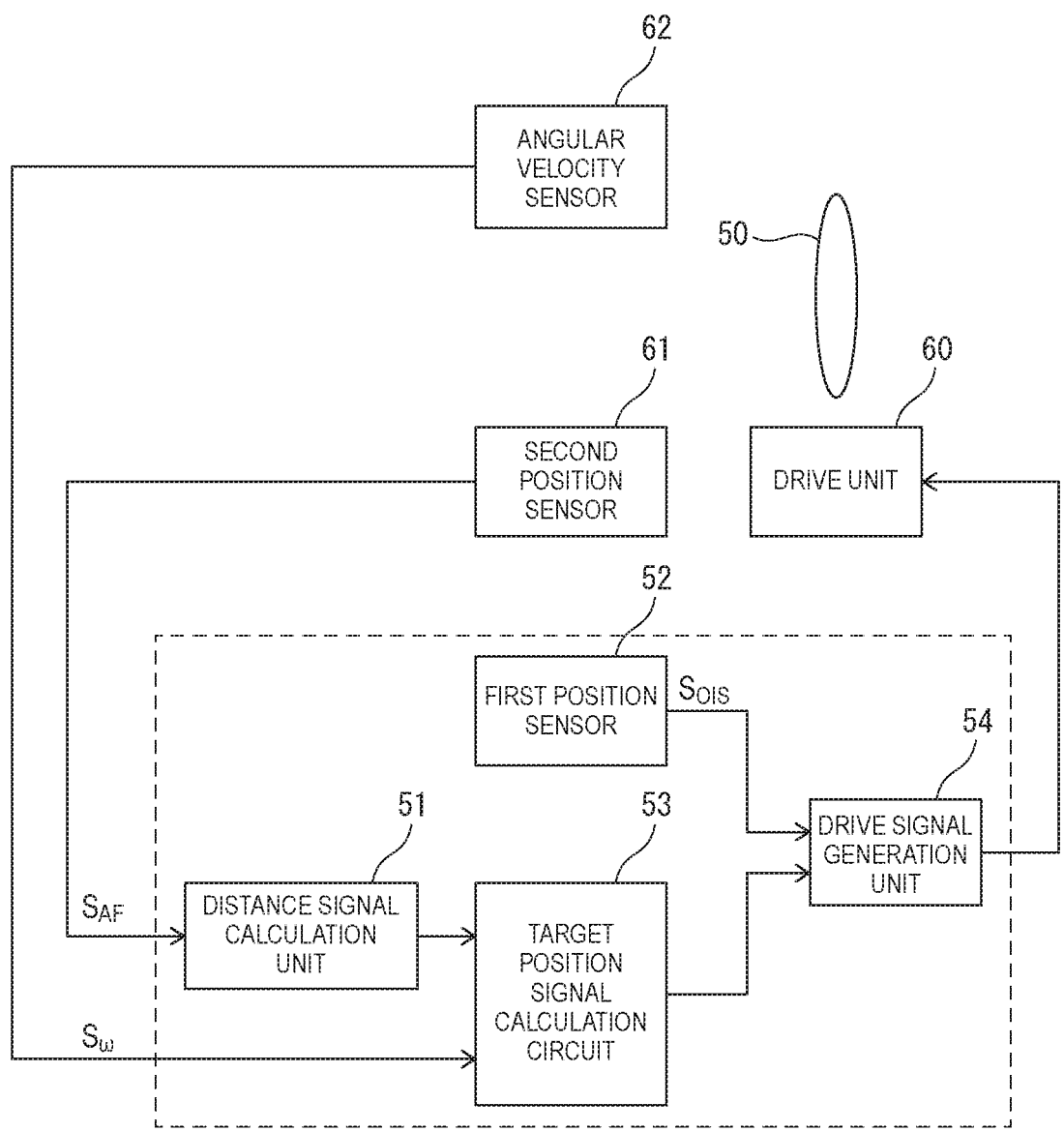
FIG. 6 is a configuration diagram for describing an image stabilizer according to a third embodiment of the present invention.

FIG. 6 is a configuration diagram for describing an image stabilizer according to a third embodiment of the present invention.

A position control device in the third embodiment includes the first position sensor 52, the distance signal calculation unit 51, the target position signal calculation circuit 53, the drive signal generation unit 54, a second position sensor 61, and an angular velocity sensor 62.

The second position sensor 61 detects the lens position in the auto-focus direction, and outputs the second position detection signal $S_{AF}$. The angular velocity sensor 62 detects the angular velocity of the lens 50 in the camera shake direction, and outputs the angular velocity signal $S_\omega$. Closed loops are configured for both the auto-focus direction and the camera shake direction.

Fourth Embodiment

An adjustment method of a fourth embodiment includes a step of moving a lens from one end to the other end of a moving range in an optical axis direction, a step of storing, in a storage unit, second detection position signals of a second position sensor detected at the both ends, a step of moving the lens from one end to the other end of a moving range in a camera shake direction, and a step of storing, in the storage unit, first detection position signals of a first position sensor detected at the both ends. It is to be noted that a configuration in which the second detection position signals are stored in a second storage unit and the first detection position signals are stored in a first storage unit may be used.

Firstly, a correspondence relationship between the lens position and the second detection position signal when the lens is located at the end in the optical axis direction is stored. Accordingly, adjustment for calculating the distance signal between the imaging element and the lens based on the second detection position signal is performed. Next, a correspondence relationship between the lens position and the first detection position signal when the lens is located at the end in the camera shake direction is stored. Accordingly, adjustment for calculating the target position signal based on the amount of movement of the lens in the camera shake direction is performed.

It is to be noted that the signal corresponding to the distance between the imaging element and the lens when the lens is located at the end in the optical axis direction may be calculated and stored during the adjustment or may be stored in advance.

Hereinafter, an example thereof will be specifically described.

Firstly, the adjustment for calculating the distance between the imaging element and the lens based on the second detection position signal that indicates the position of the lens that moves in the auto-focus direction is performed.

The second detection position signal of the second position sensor when the lens is located at the end of the moving range, which is closer to the imaging element, in the optical axis direction is regarded as Sf1, the second detection position signal of the second position sensor when the lens is located at the other end of the moving range is regarded as Sf2, and both are stored in the storage unit.

The shortest distance fmin between the lens and the imaging element and the distance signal corresponding to the moving range L of the lens are assumed to be stored in the storage unit.

For example, in a mode where the second detection position signal varies linearly with respect to the movement of the lens in the optical axis direction, when the lens moves in the auto-focus direction and the second detection position signal of the second position sensor is Sfz, a distance Fz between the lens and the imaging element can be calculated by the following expression.

$$Fz = L/(Sf2 - Sf1) \times (Sfz - Sf1) + f\min$$

Accordingly, the distance signal between the imaging element and the lens can be calculated by using the second detection position signal that indicates the position of the lens that moves in the auto-focus direction.

Next, a target position X to which the lens is moved in the optical axis direction is calculated by the following expression, on the basis of the distance signal between the imaging element and the lens and the angular signal that indicates the angle at which the lens is inclined from the optical axis direction.

$$X = Fz \times \tan\theta$$

Next, the adjustment for calculating the target position signal of the lens in the camera shake direction based on the distance signal and the angular signal that indicates the angle at which the lens is inclined from the optical axis direction is performed.

For simplicity, the case where the lens is moved from the one end to the other end in the camera shake direction at a position apart from the imaging element by the shortest distance fmin, is considered.

The first detection position signal of the first position sensor at the one end in the camera shake direction regarded as Sois1 and the first detection position signal of the first position sensor at the other end in the camera shake direction regarded as Sois2 are stored in the storage unit.

The signal corresponding to the moving range in which the lens moves in the camera shake direction (for example, Xmax to Xmin) is assumed to be stored in the storage unit.

For example, in a mode where the first detection position signal varies linearly with respect to the movement of the lens in the camera shake direction, when the lens moves in the auto-focus direction and the lens moves in the camera shake direction by the angle θ, the target position signal can be calculated by the following expression.

$$\begin{aligned}
\text{target position signal} &= (Sois2 - Sois1)/2 + Sois1 + \\
&\quad (Sois2 - Sois1)/(X\max - X\min) \times X \\
&= (Sois2 + Sois1)/2 + (Sois2 - Sois1) \times \\
&\quad (Fz \times \tan\theta)/(X\max - X\min)
\end{aligned}$$

By performing the above adjustment, the image stabilization can be accurately performed also when the lens moves in the auto-focus direction. Furthermore, a mode in which adjustment is performed with respect to, in addition to camera shake in a first axis direction perpendicular to the optical axis direction, camera shake in a second axis direction perpendicular to the optical axis direction and the first axis direction may be used.

The above is an example, and another method may be used. For example, the end in the optical axis direction may be an end of a mechanical moving range, or an end of a moving range regarding a focal distance (distance between the lens and the imaging element) corresponding to any subject distance (distance between the lens and a subject). In addition, a mode in which a correspondence relationship between an arbitrary distance between the imaging element and the lens and the second detection position signal of the second position sensor is stored may be used. In addition, a mode in which adjustment is performed by moving the lens from the one end to the other end in the camera shake direction at a position apart from the imaging element by an arbitrary distance may be used.

It is to be noted that the image stabilization can also be configured such that, when the sign of the angular signal corresponding to the angle θ is changed and the sign of the output signal of the first position sensor is changed in accordance with the inclined direction of the lens from the optical axis direction, the sign of the target position signal is also changed in accordance with the inclined direction.

In addition, as in the above-described expression, it may be configured such that, when the lens does not move in the camera shake direction (angle)θ=0°, the target position signal (=(Sois2+Sois1)/2) in which the lens is located at the center between the one end and the other end in the camera shake direction is outputted.

It may be adjusted such that a correspondence relationship between the distance between the imaging element and the lens and the second detection position signal when the lens moves in the optical axis direction, and a correspondence relationship between the amount of movement and the first detection position signal when the lens moves in the camera shake direction are stored. Thus, a mode in which the second detection position signals themselves of the second position sensor detected at the both ends in the auto-focus direction are stored, and furthermore, a conversion factor for calculating the distance signal obtained by the adjustment is stored in the storage unit of the image stabilizer may be used. Similarly, a mode in which the first detection position signals of the first position sensor detected at the both ends in the camera shake direction are stored, and furthermore, a conversion factor for calculating the target position signal obtained by the adjustment is stored in the storage unit of the image stabilizer may be used.

Fifth Embodiment

Figure 7:
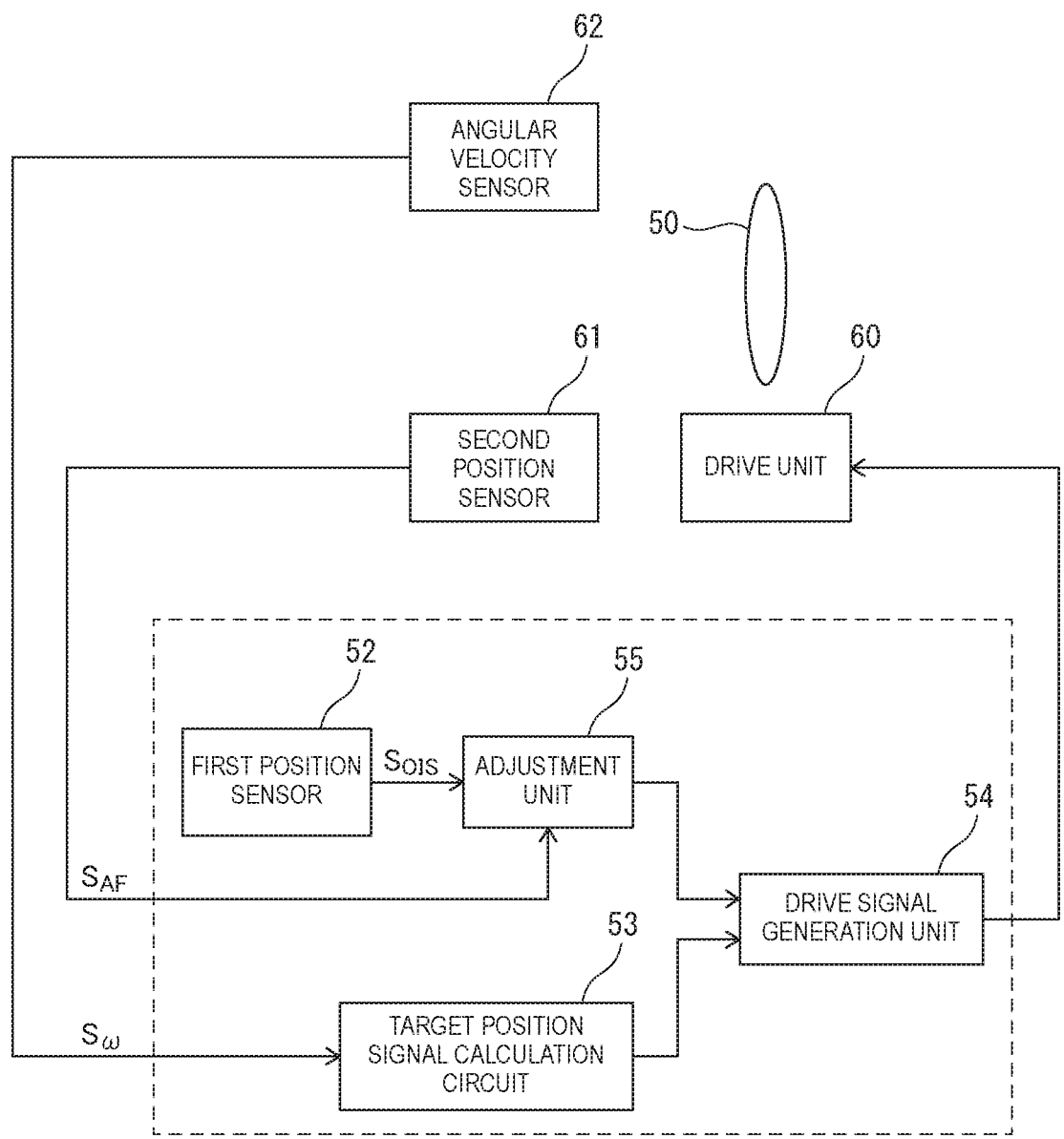
FIG. 7 is a configuration diagram for describing an image stabilizer according to a fifth embodiment of the present invention.

FIG. 7 is a configuration diagram for describing an image stabilizer according to a fifth embodiment of the present invention.

The fifth embodiment is a mode in which the second detection position signal is fed back to an adjustment unit 55 that adjusts the first detection position signal of the first position sensor 52.

In particular, the distance F between the lens and the imaging element is calculated on the basis of the second detection position signal, and gain adjustment is performed with a coefficient obtained by dividing a reference distance F0 between the lens and the imaging element by the distance F. For example, when the lens moves in the auto-focus direction by a distance A from the reference distance F0, gain adjustment is performed with a coefficient F0/(F0+A). Accordingly, the same operation as the first embodiment is obtained.

<Image Stabilizing Method>

An image stabilizing method of the present embodiment is an image stabilizing method for performing image stabilization of a lens that moves, with respect to an imaging element, in an auto-focus direction and a camera shake direction, and includes a step of calculating a distance between the imaging element and the lens by detecting a position of the lens that moves in the auto-focus direction, a step of calculating an angle inclined from an optical axis direction by detecting an angular velocity of the lens in the camera shake direction, a step of calculating an amount of movement of the lens in the camera shake direction from the calculated distance and angle, a step of detecting a current position of the lens that moves in the camera shake direction, and a step of moving the lens in the camera shake direction from the current position, on the basis of the amount of movement.

The distance F between the lens and the imaging element is calculated by detecting the current position in the auto-focus direction, and the amount X of movement is calculated on the basis of the distance F and the angle θ at which the lens is inclined. The lens is moved to the target position from the current position of the lens in the camera shake direction, on the basis of the amount of movement.

Accordingly, the image stabilization can be accurately performed even when the lens moves in the auto-focus direction.

Example

Figure 8:
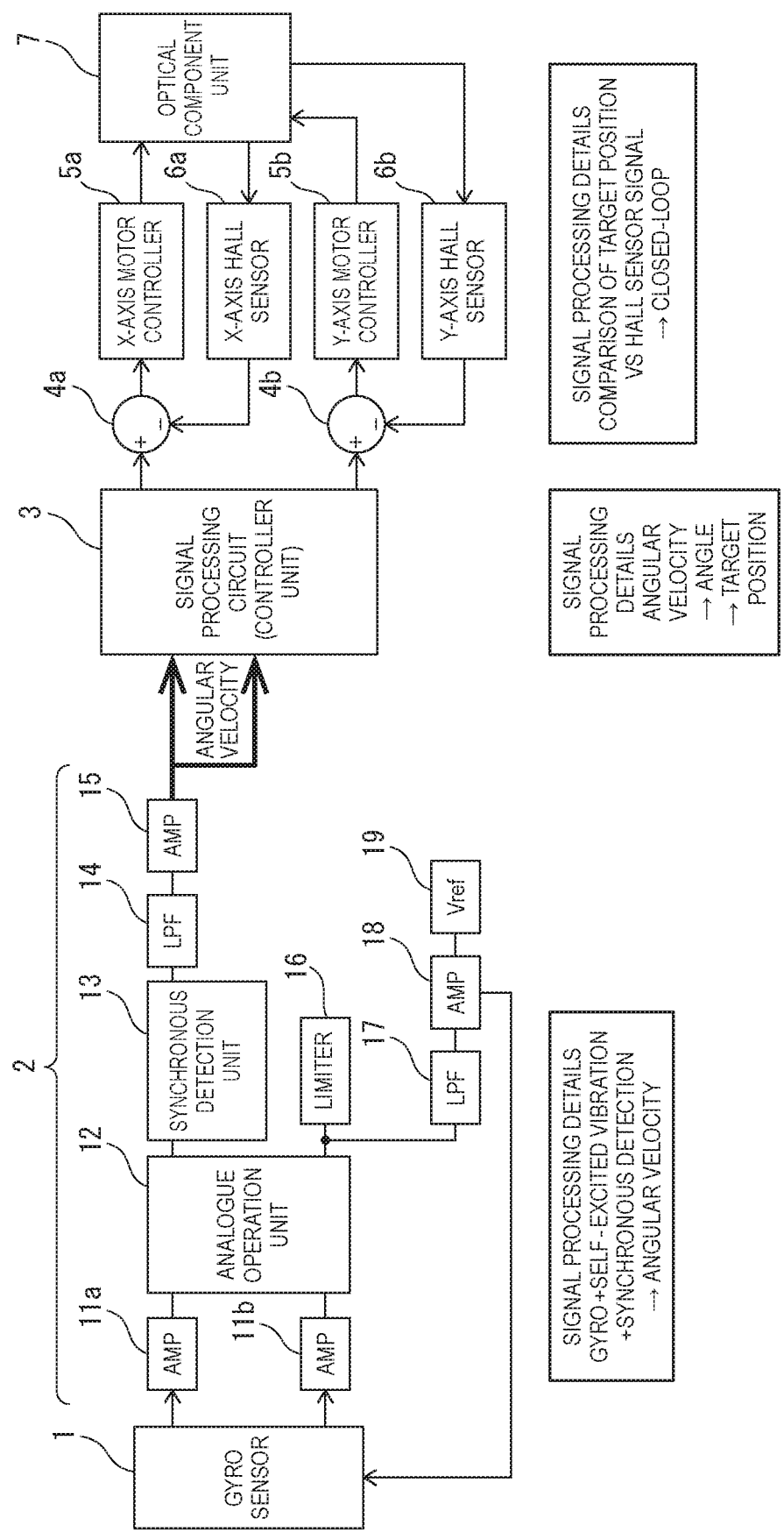
FIG. 8 is a configuration diagram of an image stabilizer on which the present invention is based.

FIG. 8 is a configuration diagram of an image stabilizer on which the present example is based.

According to the image stabilizer on which the present example is based, an angular velocity signal is obtained by processing a gyro signal from a gyro sensor 1 in a gyro signal processing unit 2. An angle θ is obtained by integrating the angular velocity signal in signal processing circuit (Signal Processing: controller circuit) 3, and then, a target position is determined, on the basis of the angle θ, by performing an operation described below.

The gyro signal processing unit 2 amplifies the gyro signal from the gyro sensor 1 through amplifiers 11a, 11b, and obtains an X-axis angular velocity signal and a Y-axis angular velocity signal from the amplified gyro signal through an analogue operation unit 12, a synchronous detection unit 13, a low-pass filter (LPF) 14, and an amplifier 15.

On the other hand, a limiter 16 and a low-pass filter 17 are connected to the analogue operation unit 12, and an amplifier 18 and a reference signal generation unit 19 are connected to the low-pass filter 17. The amplifier 18 is connected to the gyro sensor 1, and the gyro sensor 1 is configured to perform self-excited vibration.

The signal processing circuit (controller circuit) 3 receives the X-axis angular velocity signal and the Y-axis angular velocity signal obtained from the gyro signal processing unit 2, and obtains an angle θ by integration processing of the X-axis angular velocity signal and the Y-axis angular velocity signal. Then, a target position is determined, on the basis of the angle θ, by an operation described below. An X-axis PID control circuit 4a and a Y-axis PID control circuit 4b transmit control signals to an X-axis motor controller (driver) 5a and a Y-axis motor controller (driver) 5b, on the basis of a target position signal value (VTARG) obtained from the signal processing circuit (controller circuit) 3 and a position signals from an X-axis Hall sensor 6a and a Y-axis Hall sensor 6b, and control the position of a lens in an optical component unit (linear motion device) 7 including a magnet, the lens, and a drive coil.

Figure 9:
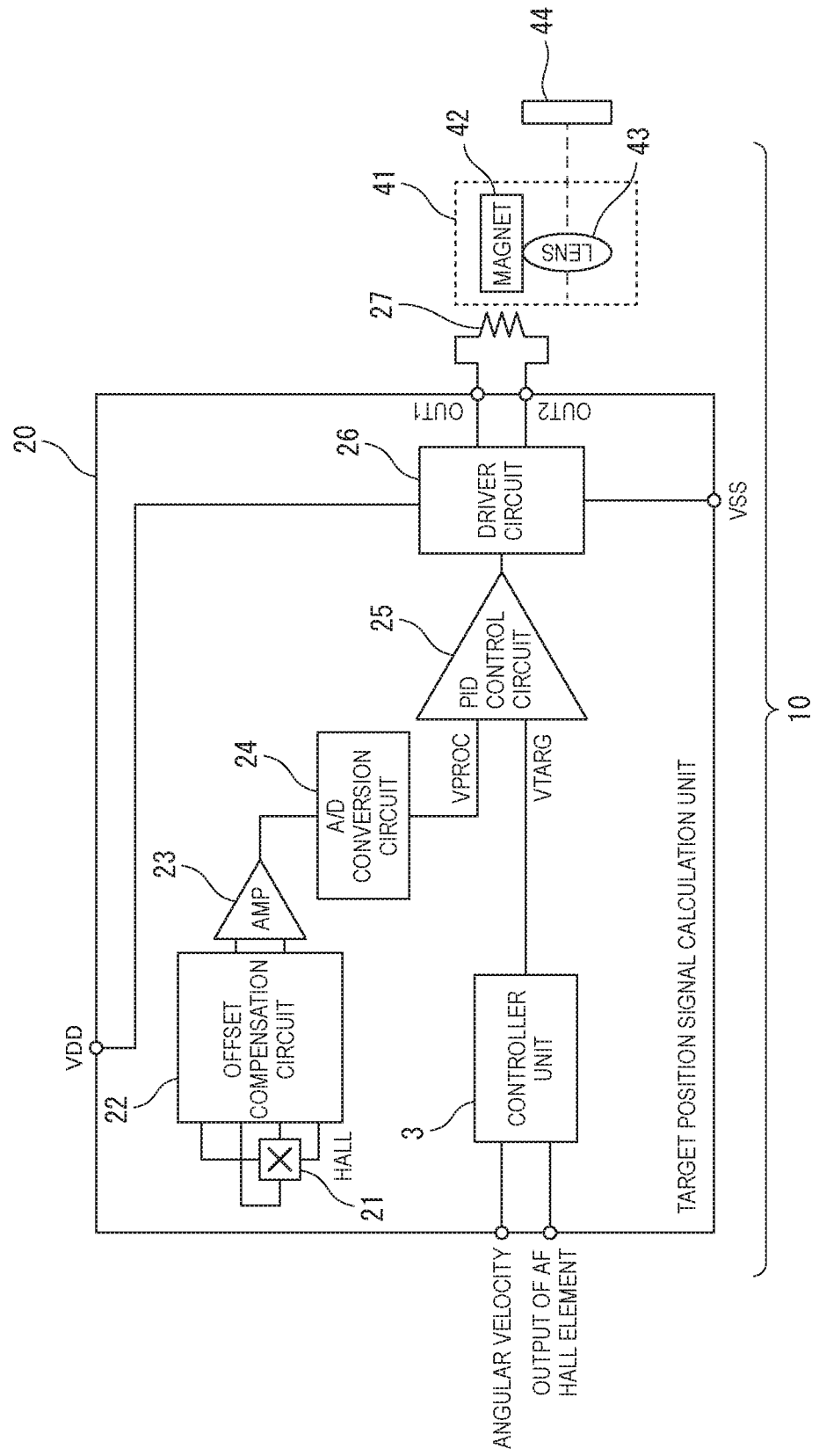
FIG. 9 is a configuration diagram of a camera module according to the present invention.

FIG. 9 is a configuration diagram of a camera module according to the present example, and is a configuration diagram for describing a control device of a linear motion device. In the drawing, reference numerals 10, 20, 21, 22, 23, 24, 25, 26, 27, 41, 42, and 43 represent a camera module, a control device, a magnetic field sensor (Hall element), an offset compensation circuit, an amplifier, an A/D conversion circuit, a PID control circuit (control unit), a driver circuit, a drive coil, a linear motion device, a magnet, and an OIS lens, respectively. It is to be noted that components having the same function as those in FIG. 8 are denoted by the same reference numerals.

The magnetic field sensor 21 corresponds to the first position sensor 52, the PID control circuit 25 and the driver circuit 26 correspond to the drive signal generation unit 54, the drive coil 27 corresponds to the drive unit 60, a target position signal calculation unit corresponds to the target position signal calculation circuit 53 and the distance signal calculation unit 51, and output of an AF Hall element corresponds to the second detection position signal.

The camera module of the present example includes a linear motion device having a lens capable of moving in a perpendicular direction and a parallel direction with respect to an optical axis, an actuator unit arranged in the vicinity of the linear motion device, a position detection sensor capable of detecting a position of the lens, a control unit capable of controlling the position of the lens, a controller circuit that outputs a target position of the lens, and a driver unit that drives the actuator and moves the lens by driving the actuator unit. When the lens is moved in a planar direction perpendicular to an optical axis direction and a position of the lens in the planar direction perpendicular to the optical axis direction is controlled, the control can be performed using also position information in the parallel direction with respect to the optical axis.

The camera module of the present example is a camera module that includes the linear motion device 41 having the magnet 42 attached to a movable body, the OIS drive coil 27 arranged in the vicinity of the magnet 42 of the linear motion device 41, and an AF drive coil (not illustrated in the drawing), and moves the lens 43 fixed to the magnet 42 by force generated by flowing of a coil current in the OIS drive coil 27.

The magnetic field sensor 21 detects a magnetic field generated by the magnet 42, and outputs a detection position signal value VPROC corresponding to a value of the detected magnetic field. The controller circuit 3 outputs a target position signal value VTARG indicating a target position to which the linear motion device 41 should be moved, on the basis of an angular velocity signal obtained by detecting an angular velocity of an object and an output signal from an AF position sensor.

The control unit 25 generates a control signal for moving the lens 43 to the target position, on the basis of the detection position signal value VPROC by the magnetic field sensor 21 and the target position signal value VTARG by the controller circuit 3. The driver circuit 26 supplies a drive current to the drive coil 27, on the basis of the control signal by the control unit 25. In addition, the control unit 25 generates the control signal by PID control.

In addition, the magnetic field sensor is preferably a Hall element. In addition, the linear motion device and the drive coil can be embedded in the camera module.

In FIG. 9, application to the control device 20 that performs position adjustment of the lens of the camera module 10 will be described. The control device (position control circuit) 20 is configured as, for example, an IC circuit. It is to be noted that the camera module 10 includes the linear motion device 41 and the drive coil 27 that moves the lens 43. Therefore, by passing a current through the drive coil 27, the magnet 42 is moved, and the position adjustment of the lens 43 fixed to the magnet 42 becomes possible.

More specifically, the control device 20 of the linear motion device 41 includes the drive coil 27 arranged in the vicinity of the magnet 42 of the linear motion device 41 having the magnet 42 attached to the lens (movable body) 43, and is configured to move the magnet 42 by force generated by flowing of a coil current in the drive coil 27.

The magnetic field sensor 21 detects a magnetic field generated by the magnet 42, and outputs a detection position signal value VPROC corresponding to a value of the detected magnetic field. More specifically, the magnetic field sensor 21 converts the magnetic field generated by the magnet 42 of the camera module 10 into an electrical signal, and outputs a detection position signal to the amplifier 23. The amplifier 23 amplifies the detection position signal inputted from the magnetic field sensor 21 through the offset compensation circuit 22. It is to be noted that the magnetic field sensor 21 is preferably a Hall element.

In addition, the A/D conversion circuit 24 A/D converts the detection position signal from the magnetic field sensor 21 after amplifying by the amplifier 23, and obtains the A/D converted detection position signal value VPROC.

In addition, the controller circuit 3 uses an angular velocity signal from the gyro signal processing unit 2 illustrated in FIG. 8 and a signal from the AF position sensor as input, controls the position of the device (lens), and outputs a target position signal value VTARG. The controller circuit 3 is connected to the PID control circuit 25.

In addition, the PID control circuit 25 is connected to the A/D conversion circuit 24 and the controller circuit 3, and performs PID control using the detection position signal value VPROC that is an output signal from the A/D conversion circuit 24 and the target position signal value VTARG that is an output signal from the controller circuit 3 as input. More specifically, the PID control circuit 25 receives the detection position signal value VPROC from the A/D conversion circuit 24 and the target position signal value VTARG of the lens position generated in the controller circuit 3, and outputs a control signal for moving the lens 43 to the target position, on the basis of the current position of the lens 43 and the target position of the lens 43 indicated by the target position signal value VTARG.

Here, the PID control is one type of feedback control, and is a method in which control of an input value is performed by three components, a deviation between an output value and a target value, integration thereof, and differentiation thereof. Examples of basic feedback control include proportional control (P control). This controls the input value as a linear function of the deviation between the output value and the target value. In the PID control, an operation that changes the input value in proportion to the deviation is called a proportional operation or a P operation (P is an abbreviation for proportional). More specifically, when a deviation state is continued for longer periods of time, a function of making the change of the input value larger to be closer to the target value is served. An operation that changes the input value in proportion to the integration of the deviation is called an integral operation or an I operation (I is an abbreviation for integral). A control method in which the proportional operation and the integral operation are combined in this manner is called PI control. An operation that changes the input value in proportion to the differentiation of the deviation is called a differential operation or a D operation (D is an abbreviation for derivative or differential). A control method in which the proportional operation, the integral operation, and the differential operation are combined is called PID control.

The output signal from the PID control circuit 25 is D/A converted by a D/A conversion circuit (not illustrated in the drawing), and a drive current is supplied to the drive coil 27 by the driver circuit 26, on the basis of the detection position operation signal value VPROC and the target position signal value VTARG. More specifically, the driver circuit 26 generates output signals Vout1, Vout2, on the basis of the control signal from the PID control circuit 25. The output signals Vout1, Vout2 are supplied to both ends of the drive coil 27 of the camera module 10.

It is to be noted that, in the above description, the linear motion device includes the lens 43 and the magnet 42 attached to the lens 43, but the drive coil may be further included in the linear motion device.

In addition, in FIG. 9, only one axis is illustrated, but two axes are required in the case of image stabilization. Therefore, preferably, one more camera module having the exact same configuration as FIG. 9 is provided, and there are two modules in total. In addition, although there are two Hall elements 21, two drive coils 27, and two magnets 42, other circuits may be shared between the two axes.

In this manner, when the moving range of the lens is changed, accurate position control of the linear motion device can be made possible.

Figure 10:
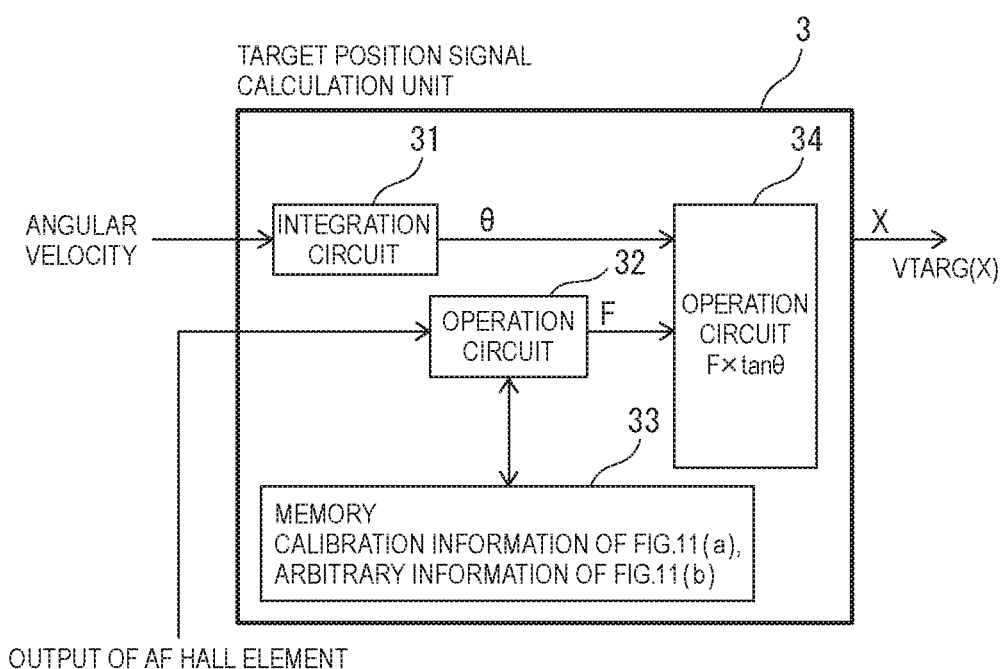
FIG. 10 is a circuit configuration diagram of a controller circuit in FIG. 9.

FIG. 10 is a circuit configuration diagram of the controller circuit in FIG. 9. In the drawing, reference numerals 31, 32, 33, and 34 represent an integration circuit, a first operation circuit, a memory, and a second operation circuit, respectively.

The controller circuit 3 operates, on the basis of an angular signal θ (integration of the angular velocity signal) obtained by integrating the angular velocity signal and a distance signal F between the lens 43 and an imaging element 44, a distance signal X by which the lens 43 should be moved using the following relational expression:

$$X = \tan\theta \times F$$

to obtain the target position signal value VTARG.

In addition, the distance signal F has the following relationship:

$$F = f * Co$$

(where "*" represents any of four arithmetic operations or a combination thereof. Alternatively F may be directly obtained by another method).

It is to be noted that f represents a design distance between the lens and the imaging element, and Co represents a coefficient.

In addition, the controller circuit 3 includes the integration circuit 31 that obtains the angular signal θ on the basis of the angular velocity signal, the first operation circuit 32 that obtains the distance signal F between the lens 43 and the imaging element 44, on the basis of the output of the AF position sensor, and the second operation circuit 34 that obtains the target position signal value VTARG, on the basis of the angular signal θ from the integration circuit 31 and the distance signal F from the first operation circuit 32.

In addition, the controller circuit 3 includes the memory 33 in which calibration information based on a relationship between the position of the lens 43 and the output from the magnetic field sensor 21, calibration information based on a relationship between the position of the lens 43 and the AF position sensor, and information based on a relationship between a subject distance and a distance between the lens 43 and the imaging element 44 are stored.

More specifically, F in the above expression is obtained from the output of the AF Hall element, and the target position X (VTARG) to which the image stabilizing lens should be moved is obtained by tan θ×F as in the above expression. Here, as an example of a method for obtaining F on the basis of the output of the AF Hall element, for example, F can be obtained by the following method after assembling a camera module (actuator module+imaging element).

Figure 11A:
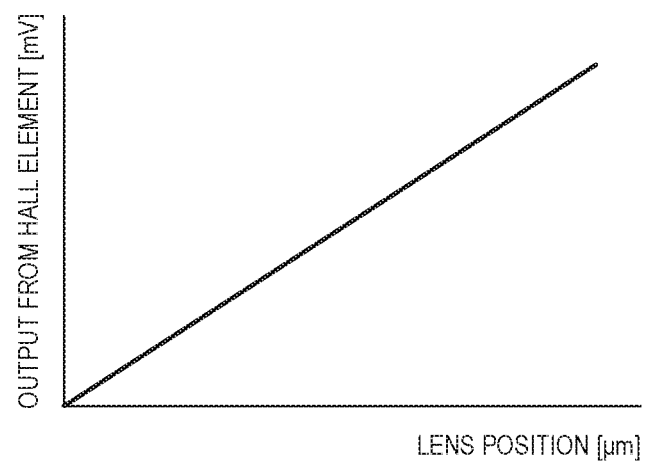
FIG. 11A and FIG. 11B are diagrams illustrating graphs of a relationship between a lens position and Hall output, and a relationship between a subject distance and a distance between a lens and an imaging element, respectively.
Figure 11B:
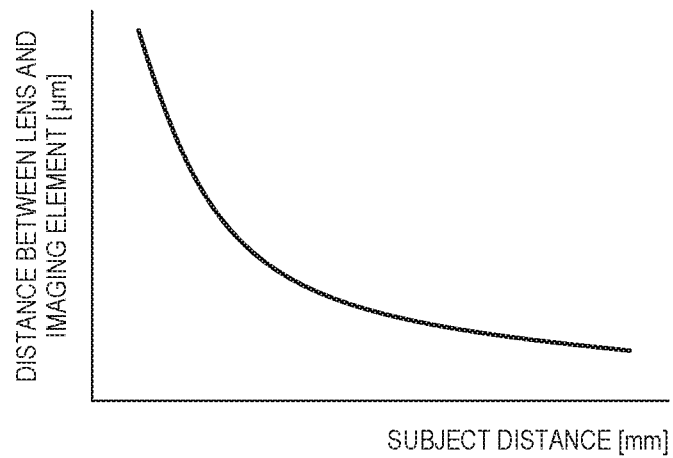

FIG. 11A and FIG. 11B are diagrams illustrating graphs of a relationship between a lens position and Hall output, and a relationship between a subject distance and a distance between the lens and the imaging element, respectively.

1) The lens position and the Hall output are related by calibration (FIG. 11A).

2) The relationship between the subject distance and GAP (between the lens and the imaging element) in focusing is a one-on-one relationship (FIG. 11B).

3) Values of arbitrary two points of the relationship of FIG. 11B in an actuator module to be used are grasped (may be obtained by measurement or calculation) and stored in a memory.

For example, it is assumed that, when the subject distance is 3 m, GAP is 200 μm, and when the subject distance is 10 cm, GAP is 400 μm.

Accordingly, the output of the Hall element and the lens position (GAP or F) are related by FIG. 11A. More specifically, F can be obtained from the output of the AF Hall element.

Hereinafter, an operation of the controller circuit will be described on the basis of FIG. 10.

The angular velocity signal from the gyro signal processing unit 2 illustrated in FIG. 8 is integrated by the integration circuit 31 to obtain the angle θ. On the other hand, the signal F is obtained by the first operation circuit 32, on the basis of the signal from the AF Hall element, from the relationship between the lens position and the output from the Hall element illustrated in FIG. 11A. The memory 33 is connected to the first operation circuit 32, and the calibration information of FIG. 11A and arbitrary information in the relationship between the subject distance and the distance between the lens and the imaging element illustrated in FIG. 11B are stored in the memory 33.

It is to be noted that, here, the calibration means that the detection position operation signal value corresponding to a first position signal value NEGCAL corresponding to a home position and a second position signal value POSCAL corresponding to a full position in AF is obtained and is made to be stored in the memory 33.

The second operation circuit 34 performs the operation of X=tan θ×F, on the basis of the angle θ from the integration circuit 31 and the signal F from the first operation circuit 32, and obtains the distance X by which the lens should be moved. The signal X corresponds to the target position signal value VTARG illustrated in FIG. 9.

In this manner, a camera module, in which a lens position control unit that detects a lens position and controls the detected lens position includes an auto-focus mechanism and an image stabilizing mechanism, and the performance of the image stabilizing mechanism is improved by feeding back information of a lens position in the AF mechanism in a lens module when controlling a lens position in the image stabilizing mechanism, can be obtained.

FIG. 12 is a diagram illustrating a flow chart for describing a position control method of an optical component (lens) in the camera module according to the present example.

The position control method of a lens in the camera module according to the present example is a position control method of an optical component in a camera module, the camera module including a linear motion device having a lens capable of moving in a perpendicular direction and a parallel direction with respect to an optical axis, an actuator unit arranged in the vicinity of the linear motion device, a position detection sensor capable of detecting a position of the lens, a control unit capable of controlling the position of the lens, a controller circuit that outputs a target position of the lens, and a driver unit that drives the actuator, and moves the lens by driving the actuator unit. When the lens is moved in a planar direction perpendicular to an optical axis direction and a position of the lens in the planar direction perpendicular to the optical axis direction is controlled, the control can be performed using also position information in the parallel direction with respect to the optical axis.

The position control method of a lens in the camera module of the present example is a position control method of a lens in a camera module, the camera module including a linear motion device having a magnet attached to a movable body, and a drive coil arranged in the vicinity of the magnet of the linear motion device, and moving the lens fixed to the magnet by force generated by flowing of a coil current in the drive coil.

Firstly, in Step S1, a magnetic field generated by the magnet 42 is detected, and a detection position signal value VPROC corresponding to a value of the detected magnetic field is outputted by the magnetic field sensor 21. Next, in Step S2, a target position signal value VTARG indicating a target position to which the linear motion device 41 should be moved is outputted by the controller circuit 3, on the basis of an angular velocity signal obtained by detecting an angular velocity of an object and an output signal from an AF position sensor.

Next, in Step S3, a control signal for moving the lens 43 to the target position is generated by the control unit 25, on the basis of the detection position signal value VPROC by the magnetic field sensor 21 and the target position signal value VTARG by the controller circuit 3. Next, in Step S4, a drive current is supplied to the drive coil 27 by the driver circuit 26, on the basis of the control signal by the control unit 25.

In addition, in the step of outputting the target position signal value by the controller circuit 3, on the basis of an angular signal θ obtained by integrating the angular velocity signal and a distance signal F between the lens 43 and an imaging element 44, a distance signal X by which the lens 43 should be moved is operated using the following relational expression:

$$X = \tan\theta \times F$$

to obtain the target position signal value VTARG.

In addition, the step of outputting the target position signal value by the controller circuit 3 includes a step of obtaining the angular signal θ on the basis of the angular velocity signal, by the integration circuit 31, a step of obtaining the distance signal F between the lens 43 and the imaging element 44, on the basis of the output of the AF position sensor, by the first operation circuit 32, and a step of obtaining the target position signal value VTARG, on the basis of the angular signal θ from the integration circuit 31 and the distance signal F from the first operation circuit 32, by the second operation circuit 34.

In addition, the step of outputting the target position signal value by the controller circuit 3 includes a step of storing calibration information based on a relationship between the position of the lens 43 and the output from the magnetic field sensor 21, calibration information based on a relationship between the position of the lens 43 and the output from the AF position sensor, and information based on a relationship between a subject distance and a distance between the lens 43 and the imaging element 44, in a memory 33. In addition, in the step of generating the control signal by the control unit 25, the control signal is generated by PID control.

In this manner, an image stabilizer and an adjustment method thereof, an image stabilizing circuit, an image stabilizing method, and a position control method of a lens in a camera module, in which a lens position control unit that detects a lens position and controls the detected lens position includes an auto-focus mechanism and an image stabilizing mechanism, and the performance of the image stabilizing mechanism is improved by feeding back information of a lens position in the AF mechanism in a lens module when controlling a lens position in the image stabilizing mechanism, can be obtained.

According to one aspect of the present invention, an image stabilizer and an adjustment method thereof, an image stabilizing circuit, an image stabilizing method, and a camera module and a position control method of an optical component thereof, in which a lens position control unit that detects a lens position and controls the detected lens position includes an auto-focus mechanism and an image stabilizing mechanism, and the performance of the image stabilizing mechanism is improved by feeding back information of a lens position in the AF mechanism in a lens module when controlling a lens position in the image stabilizing mechanism, can be obtained.

As described above, although the present invention has been described with reference to the specific embodiments, it is not intended to limit the invention by the description. By referring to the description of the present invention, various modifications of the disclosed embodiments and other embodiments of the present invention are apparent to those skilled in the art. Therefore, it should be understood that claims cover these modifications or embodiments included in the technical scope and spirit of the present invention.

REFERENCE SIGNS LIST

1 gyro sensor
2 gyro signal processing unit
3 signal processing circuit
4a X-axis PID control circuit
4b Y-axis PID control circuit
5a X-axis motor controller (driver)
5b Y-axis motor controller (driver)
6a X-axis Hall sensor
6b Y-axis Hall sensor
7 optical component unit (linear motion device)
10 camera module
11a, 11b, 15, 18, 23 amplifier (amp)
12 analogue operation unit
13 synchronous detection unit
14, 17 low-pass filter (LPF)
16 limiter
19 reference signal generation unit
20 control device
21 magnetic field sensor (Hall element)
22 offset compensation circuit
24 A/D conversion circuit
25 PID control circuit (control unit)
26 driver circuit
27 drive coil
31 integration circuit
32 first operation circuit
33 memory
34 second operation circuit
41 linear motion device 42 magnet
43 OIS lens
50 lens
51 distance signal calculation unit
52 first position sensor
53 target position signal calculation circuit
54 drive signal generation unit
55 adjustment unit
60 drive unit
61 second position sensor
62 angular velocity sensor
511 distance signal operation unit
512 integration circuit
513 operation circuit
514 storage unit

The invention claimed is:

1. An image stabilizer for a lens that moves, with respect to an imaging element, in an auto-focus direction and a camera shake direction, the image stabilizer comprising:
   a first position sensor configured to detect a position of the lens in the camera shake direction, and output a first detection position signal;
   a second position sensor configured to detect the position of the lens that moves in the auto-focus direction, and output a second detection position signal;
   a memory configured to store two third detection position signals each indicating a position of the lens in the auto-focus direction, one indicating the position of the lens located at one end of a moving range of the lens, the other indicating the position of the lens located at the other end of the moving range of the lens, the memory further storing a reference distance between the lens and the imaging element when the lens located at a reference position and a distance signal corresponding to the moving range of the lens;
   a distance signal calculation unit configured to:
      calculate a movement distance of the lens moved from the reference position in the auto-focus direction based on the second detection position signal, the two third detection position signals indicating the both ends of the moving range of the lens, and the distance signal corresponding to the moving range of the lens; and
      calculate a distance signal that indicates an absolute distance between the imaging element and the lens by adding the movement distance and the reference distance between the lens and the imaging element;
   a target position signal calculation circuit configured to receive the distance signal, and an angular signal that indicates an angle at which the lens is inclined from the optical axis direction, and calculate a target position signal of the lens in the camera shake direction based on the distance signal and the angular signal; and
   a drive signal generation unit configured to generate a drive signal that drives the lens in the camera shake direction, on the basis of the target position signal and the first detection position signal.

2. The image stabilizer according to claim 1, wherein the target position signal calculation circuit is configured to calculate the target position signal, on the basis of the distance F between the imaging element and the lens calculated on the basis of the second detection position signal and an angle θ at which the lens is inclined from the optical axis direction, such that an amount X of movement in the camera shake direction is a following relational expression:

$$X = F \times \tan\theta.$$

3. A position control device comprising:
   the image stabilizer according to claim 1;
   a drive unit configured to drive the lens in the camera shake direction in accordance with the drive signal;
   a second position sensor configured to detect the position of the lens that moves in the auto-focus direction, and output the second detection position signal;
   an angular velocity sensor configured to detect an angular velocity when the lens is inclined from the optical axis direction, and output an angular velocity signal; and
   an integration circuit configured to integrate the angular velocity signal to calculate the angular signal.

4. An adjustment method of the image stabilizer according to claim 1,
   wherein the adjustment method is performed after assembling the camera module,
   the camera module comprises:
      a lens moving, with respect to the imaging element, in an auto-focus direction and a camera shake direction;
      an actuator module for driving the lens;
      an imaging element; and
      the image stabilizer,
   the adjustment method comprising:
      moving the lens from one end to the other end of a moving range in the auto-focus direction;
      storing second detection position signals of a second position sensor detected at the both ends of the moving range in the auto-focus direction;
      moving the lens from one end to the other end of a moving range in the camera shake direction; and
      storing first detection position signals of a first position sensor detected at the both ends of the moving range in the camera shake direction,
   wherein the first position sensor is configured to detect a position of the lens in the camera shake direction, and output the first detection position signal, the second detection position signal indicates a position of the lens in the auto-focus direction,
   the distance signal calculation unit is adjusted by relating a relational expression for calculating the distance between imaging element and the lens based on the second detection position signals at the both ends stored in the memory, and
   the target position signal calculation unit is adjusted by relating a relational expression for calculating the target position signal based on the first detection position signal, the any one of the angular velocity signal and the angular signal and the distance signal to the first detection position signals of a first position sensor detected at the both ends of the moving range in the camera shake direction stored in the memory.

5. A camera module comprising:
   a lens;
   an imaging element;
   the image stabilizer according to claim 1; and
   an actuator unit configured to move the lens respect to the imaging unit in the auto-focus direction and the camera shake direction;
   wherein auto focus and image stabilization are performed by the lens.

6. The image stabilizer according to claim 1,
   wherein the distance signal calculation unit calculate the movement distance of the lens moved from the reference position in the auto-focus direction using a formula L/(Sf2−Sf1)×(Sfz−Sf1), wherein Sf1, Sf2 indicate the two third detection position signals, Sfz indicates the second detection position signal, and L indicates the distance signal corresponding to the moving range of the lens.

7. An image stabilizing circuit for a lens that moves, with respect to an imaging element, in an auto-focus direction and a camera shake direction, the image stabilizing circuit comprising:
    a memory configured to store two third detection position signals each indicating a position of the lens in the auto-focus direction, one indicating the position of the lens located at one end of a moving range of the lens, the other indicating the position of the lens located at the other end of the moving range of the lens, the memory further storing a reference distance between the lens and the imaging element when the lens located at a reference position and a distance signal corresponding to the moving range of the lens;
    a distance signal calculation unit configured to:
        receive a second detection position signal that indicates a position of the lens in the auto-focus direction;
    calculate a movement distance of the lens moved from a reference position in the auto-focus direction based on the second detection position signal, the two third detection signals, and the distance signal corresponding to the moving range of the lens; and
    calculate a distance signal that indicates an absolute distance between the imaging element and the lens by adding the movement distance and the reference distance between the lens and the imaging element when the lens is located at the reference position;
        a target position signal calculation circuit configured to receive the distance signal, and an angular velocity signal that indicates an angular velocity when the lens is inclined from the optical axis direction, and calculate a target position signal of the lens in the camera shake direction based on the distance signal and the angular velocity signal; and
        a drive signal generation unit configured to generate a drive signal that drives the lens in the camera shake direction, on the basis of a first detection position signal that indicates a position of the lens in the camera shake direction and the target position signal.

8. The image stabilizing circuit according to claim 7, wherein
    the target position signal calculation circuit includes an integration circuit configured to integrate the angular velocity signal to output an angular signal, and an operation circuit configured to calculate the target position signal corresponding to an amount of movement in the camera shake direction on the basis of the angular signal and the distance signal.

9. The image stabilizing circuit according to claim 8, wherein
    the target position signal calculation circuit includes a first storage unit in which a correspondence relationship between the amount of movement and the first detection position signal.

10. An image stabilizing method for performing image stabilization of a lens that moves, with respect to an imaging element, in an auto-focus direction and a camera shake direction, the image stabilizing method comprising:
    detecting a position of the lens in the camera shake direction, and outputting a first detection position signal;
    detecting a position of the lens that moves in the auto-focus direction, and outputting a second detection position signal;
    calculating a movement distance of the lens moved from a reference position in the auto-focus direction based on the second detection position signal, two third detection position signals, and a distance signal corresponding to a moving range of the lens, the two third detection position signals being stored in a memory and each indicating a position of the lens in the auto-focus direction, one indicating the position of the lens at one end of the moving range of the lens, the other indicating the position of the lens at the other end of the moving range of the lens, and the distance signal corresponding to the moving range of the lens being stored in the memory;
    calculating a distance signal that indicates an absolute distance between the imaging element and the lens by adding the movement distance and a reference distance, the reference distance being in the memory as a distance between the lens and the imaging element when the lens is located at the reference position;
    receiving the distance signal, and an angular signal that indicates an angle at which the lens is inclined from the optical axis direction, and calculating a target position signal of the lens in the camera shake direction based on the distance signal and the angular signal; and
    generating a drive signal that drives the lens in the camera shake direction, on the basis of the target position signal and the first detection position signal.

11. The image stabilizing method according to claim 10, calculating the movement distance of the lens moved from the reference position in the auto-focus direction using a formula L/(Sf2−Sf1)×(Sfz−Sf1), wherein Sf1, Sf2 indicate the two third detection position signals, Sfz indicates the second detection position signal, and L indicates the distance signal corresponding to the moving range of the lens.

\* \* \* \* \*